(12) United States Patent
Venkataraman et al.

(10) Patent No.: US 12,007,828 B2
(45) Date of Patent: Jun. 11, 2024

(54) APPARATUS AND METHOD TO IMPROVE SWITCHABLE GRAPHICS SYSTEM PERFORMANCE AND ENERGY CONSUMPTION BASED APPLICATIONS AND REAL-TIME SYSTEM POWER/THERMAL BUDGETS

(71) Applicant: Intel Corporation, Santa Clara, CA (US)

(72) Inventors: Srikrishnan Venkataraman, Bangalore (IN); Mallari Hanchate, Bangalore (IN); Sayan Lahiri, Hillsboro, OR (US); Vijayakumar Dibbad, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 17/628,886

(22) PCT Filed: Aug. 3, 2020

(86) PCT No.: PCT/US2020/044787
§ 371 (c)(1),
(2) Date: Jan. 20, 2022

(87) PCT Pub. No.: WO2021/034496
PCT Pub. Date: Feb. 25, 2021

(65) Prior Publication Data
US 2022/0253124 A1    Aug. 11, 2022

Related U.S. Application Data

(60) Provisional application No. 62/889,511, filed on Aug. 20, 2019.

(51) Int. Cl.
*G06F 1/3293*    (2019.01)
*G06F 9/50*    (2006.01)
*G06T 1/20*    (2006.01)

(52) U.S. Cl.
CPC .......... *G06F 1/3293* (2013.01); *G06F 9/5094* (2013.01); *G06T 1/20* (2013.01)

(58) Field of Classification Search
CPC ............................ G06F 1/3293; G06F 9/5094
See application file for complete search history.

(56) References Cited

U.S. PATENT DOCUMENTS 8,233,000 B1    7/2012  Diard
8,717,372 B1    5/2014  Wyatt
(Continued)

FOREIGN PATENT DOCUMENTS

KR    20160063648 A    6/2016

OTHER PUBLICATIONS

International Search Report and Written Opinion dated Nov. 11, 2020 for International Application No. PCT/US2020/044787, 11 pages.

(Continued)

*Primary Examiner* — Yi Yang
(74) *Attorney, Agent, or Firm* — Schwabe, Williamson & Wyatt, P.C.

(57) ABSTRACT

A switchable graphics management scheme, which uses performance/watt information of both the iGPU/dGPU along with system real-time resources like SoC (system-on-chip) thermal, system power budgets to decide on the right GPU for rendering tasks. The scheme uses this threshold power point information along with system resources to determine the optimized GPU for tasks rendering for all (Continued)

applications and use cases. As such, the scheme of adapts to each system design based on capabilities of that specific system.

21 Claims, 17 Drawing Sheets

(56) References Cited

U.S. PATENT DOCUMENTS

| | | | | |
|---|---|---|---|---|
| 2009/0231152 A1* | 9/2009 | Tung | ................ | G06F 1/206 340/660 |
| 2010/0332799 A1* | 12/2010 | Sonobe | ................ | G06F 1/3293 712/E9.032 |
| 2012/0066535 A1 | 3/2012 | Naffziger | | |
| 2012/0313952 A1* | 12/2012 | Nakayama | ............ | G09G 5/363 345/502 |
| 2013/0155081 A1* | 6/2013 | Khodorkovsky | ....... | G06F 1/329 345/522 |
| 2013/0328890 A1 | 12/2013 | Avkarogullari et al. | | |
| 2014/0223199 A1 | 8/2014 | Naffziger | | |
| 2015/0169381 A1* | 6/2015 | Ramadoss | ................ | G06F 1/32 345/522 |
| 2016/0321594 A1* | 11/2016 | Linde | ................ | G06F 11/008 |
| 2017/0241658 A1* | 8/2017 | Salsbury | ................ | F24F 11/83 |
| 2020/0142466 A1* | 5/2020 | Naik | ................ | G06N 3/045 |

OTHER PUBLICATIONS

Office Action dated Feb. 8, 2023 for IN Application No. 202247003334, 7 pages.
Extended European Search Report dated Aug. 25, 2023 for EP Application No. 20855777.7, 6 pages.
Office Action issued Mar. 22, 2024 for EP Application No. 20855777.7, 5 pages.

* cited by examiner

SAMPLE COMMAND FORMAT 900

APPARATUS AND METHOD TO IMPROVE SWITCHABLE GRAPHICS SYSTEM PERFORMANCE AND ENERGY CONSUMPTION BASED APPLICATIONS AND REAL-TIME SYSTEM POWER/THERMAL BUDGETS

CROSS REFERENCE TO RELATED APPLICATIONS

This patent application is a U.S. National Phase Application under 35 U.S.C. § 371 of International Application No. PCT/US2020/044787, filed Aug. 3, 2020, entitled APPARATUS AND METHOD TO IMPROVE SWITCHABLE GRAPHICS SYSTEM PERFORMANCE AND ENERGY CONSUMPTION BASED APPLICATIONS AND REAL-TIME SYSTEM POWER/THERMAL BUDGETS, which claims the benefit of U.S. Provisional Application No. 62/889,511 filed on Aug. 20, 2019, the entire contents of which are hereby incorporated by reference herein.

CLAIMS OF PRIORITY

This application claims the benefit of priority of U.S. Provisional Application 62/889,511 titled "Apparatus and Method To Improve Switchable Graphics System Performance And Energy Consumption Based Applications And Real-Time System Power/Thermal Budgets," filed Aug. 20, 2019, which is incorporated by reference in its entirety.

BACKGROUND

In existing switchable graphics systems, decision of applications using integrated graphics (iGPU) or discrete graphics (dGPU) for task rendering is solely decided by graphics software drivers and operating system (OS). Drivers/OS deciding on iGPU or dGPU for task execution neither have any information about performance per watt capabilities of GPU's nor they have any information of system resources like memory configuration, SoC (system-on-chip) thermal budget and battery power budget which are key parameters influencing both performance and energy consumption of GPU's.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
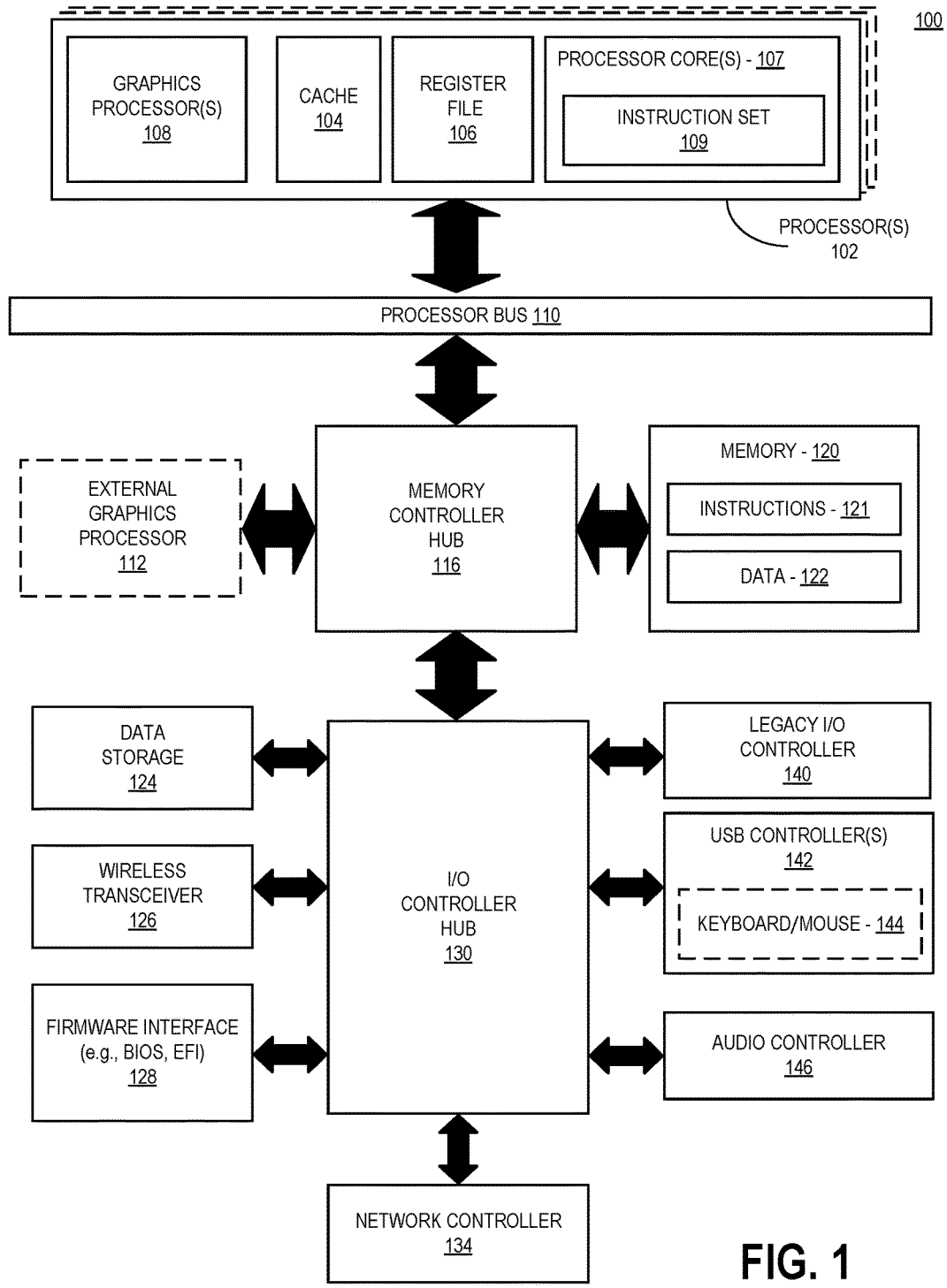
FIG. 1 illustrates a block diagram of a data processing system with apparatus to improve memory access performance between Shared Local Memory (SLM) and System Global Memory (SGM), according to some embodiments of the disclosure.

Existing solutions compare an application on its launch with list of applications in the drivers. Based on the comparison, the driver will decide on iGPU or dGPU for rendering that application. For example, a standard set of applications are pre-tested to determine if those applications need to use dGPU for rendering by comparing power and performance of same application on iGPU, and accordingly it will be categorized and listed in drivers. In some cases, a dynamic link library (DLL) associated with the application is pre-coded whether to use iGPU or dGPU. Driver and/or OS accordingly selects the GPU based on the DLL information. A user can override the driver and/or OS decision of GPU selection, but this may involve manual setting changes.

There are many system-level factors, which influence performance and energy consumption of a GPU. For example, different designs of switchable graphics systems can have different combinations of iGPU and dGPU from different vendors. Skews along with system thermal and power envelopes, memory configurations are unique for each design. Here, skews refer to variations in power drawn or thermal capabilities from typical or nominal values. So, the pre-testing method to characterize application's performance and power is very much specific to an individual system. Generalizing this driver/OS based solution may not be efficient for all designs.

Pre-characterization of applications and listing them in drivers may not cover all applications and use cases. For example, it is practically impossible to test out all applications available for users before listing them in drivers. Profile of programs may cover only but a few standard and typical applications.

Previous solutions use lookup table kind of mechanism for driver to decide on GPU for rendering. With this sort of implementation, system may not have any mechanism to look at a holistic power and performance of the GPU when multiple applications loading core and graphics are launched together. In existing switchable graphics systems, there are no hardware (HW) or software (SF) intelligence that use real-time system conditions (e.g., thermal, power budgets) and look at iGPU/dGPU performance/watt capabilities to decide on optimized GPU for task execution. With this limitation, GPU drivers cannot guarantee optimized utilization of GPU's for all uses cases and applications. As such, existing approach of drivers deciding on GPU (Graphics Processing Units) for rendering tasks is not efficient (both energy as well as performance wise) for all uses cases.

In switchable graphics systems, power and performance of iGPU and dGPU are unique for each system design as GPU's thermal design power (TDP) stock keeping unit (skus), vendors, and/or system power and/or thermal envelopes would be different for each design. It is known that dGPU rendering capability is much higher and power-wise it is optimized for medium to high-load applications. Similarly, iGPU rendering capability is relatively low compared to dGPU and it is power optimized for low to medium load applications. With this as baseline, it is expected up to a certain point (e.g., threshold power point), performance of iGPU will be same as that of dGPU but at a much lower power consumption. After this threshold power point, dGPU performance is higher than iGPU, as is the power consumption. This threshold power point will be unique for each system as it depends on the iGPU and dGPU selected for that particular system. Threshold power point also has dependencies on system memory, thermal envelopes, power budgets, etc.

To address gaps associated with the existing driver-based approaches, some embodiments describe a new switchable graphics management scheme, which uses performance/watt information of both the iGPU/dGPU along with system real-time resources like SoC (system-on-chip) thermal, system power budgets to decide on the right GPU for rendering tasks. The scheme of some embodiments uses this threshold power point information along with system resources to determine the optimized GPU for tasks rendering for all applications and use cases. As such, the scheme of various embodiments adapts to each system design based on capabilities of that specific system unlike existing solution where it is generalized for all systems.

Based on iGPU and dGPU capabilities of that particular system, real-time SoC thermal limit, system power capability, an algorithm can decide to choose the right GPU to improve system performance or energy consumption as mentioned for Case 1 and Case 2 below.

In case 1 (e.g., switch low-end graphics applications to run on dGPU resulting in improved system performance), consider the SoC core compute logic is processing a task with high power consumption. In this case, if a user launches graphic applications which are intended to use internal graphics as per driver/OS instruction, then in existing switchable graphics system SoC power management would throttle down core processing to accommodate graphics workload and contain package TDP (thermal design power). This is a tradeoff of compute performance over graphics workload. Whereas the scheme of various embodiments can keep track of such scenarios and it can feedback this information to driver/OS to use dGPU for rendering low to medium workload GFX applications and thus allows the SoC core to continue with its compute processing activity without any throttle down.

In case 2 (e.g., similar algorithm can decide to switch application from the dGPU to iGPU rendering by evaluating graphics workload power against Performance/Watt information of GPU's), consider that the driver/OS has chosen a dGPU for rendering an application. While the application is running on the dGPU, the scheme of various embodiments will get real-time average power consumed by the dGPU. If the dGPU measured power is below a certain threshold power point when compared against pre-characterized power vs performance data of GPU's, then the algorithm will initiate context switching from the dGPU to iGPU for rendering as this results in lower energy consumption at the same performance. Likewise, if multiple low-end graphics applications are using the iGPU as per existing driver/OS decision and the resulting iGPU power is above a threshold power point, then the algorithm can also take a call if all GPU rendering needs are to be switched to the dGPU as that results in better performance.

As such, best performance or optimal energy consumption is achieved by considering real-time system parameters. To an end-user, benefits are experienced in the form of performance boost or extended battery life for different use case scenarios, which are further, discussed herein. Other technical effects will be evident from the various embodiment and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a block diagram of a data processing system 100, according to some embodiments. Data processing system 100 includes one or more processors 102 and one or more graphics processors 108, and may be a single processor desktop system, a multiprocessor workstation system, or a server system having a large number of processors 102 or processor cores 107. In some embodiments, data processing system 100 is a system on a chip integrated circuit (SOC) for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, one or more processors 102 each include one or more processor cores 107 to process instructions which, when executed, perform operations for system and user software. In some embodiments, each of the one or more processor cores 107 is configured to process a specific instruction set 109. The instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109 which may include instructions to facilitate the emulation of other instruction sets. Processor core 107 may also include other processing devices, such a Digital Signal Processor (DSP).

In some embodiments, processor 102 includes cache memory 104. Depending on the architecture, processor 102 can have a single internal cache or multiple levels of internal cache. In some embodiments, the cache memory is shared among various components of processor 102. In some embodiments, processor 102 also uses an external cache (e.g., a Level-3 (L3) cache or Last Level Cache (LLC)) (not shown) which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of processor 102.

In some embodiments, processor 102 is coupled to processor bus 110 to transmit data signals between processor 102 and other components in system 100. System 100 uses an exemplary 'hub' system architecture, including a memory controller hub 116 and an input output (I/O) controller hub 130. Memory controller hub 116 facilitates communication between a memory device and other components of the system 100, while I/O Controller Hub (ICH) 130 provides connections to I/O devices via a local I/O bus.

In some embodiments, memory device 120, can be a Dynamic Random Access Memory (DRAM) device, a Static Random Access Memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with one or more graphics processors 108 in processors 102 to perform graphics and media operations.

The ICH 130 enables peripherals to connect to the memory 120 and processor 102 via a high-speed I/O bus.

The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110.

Figure 2:
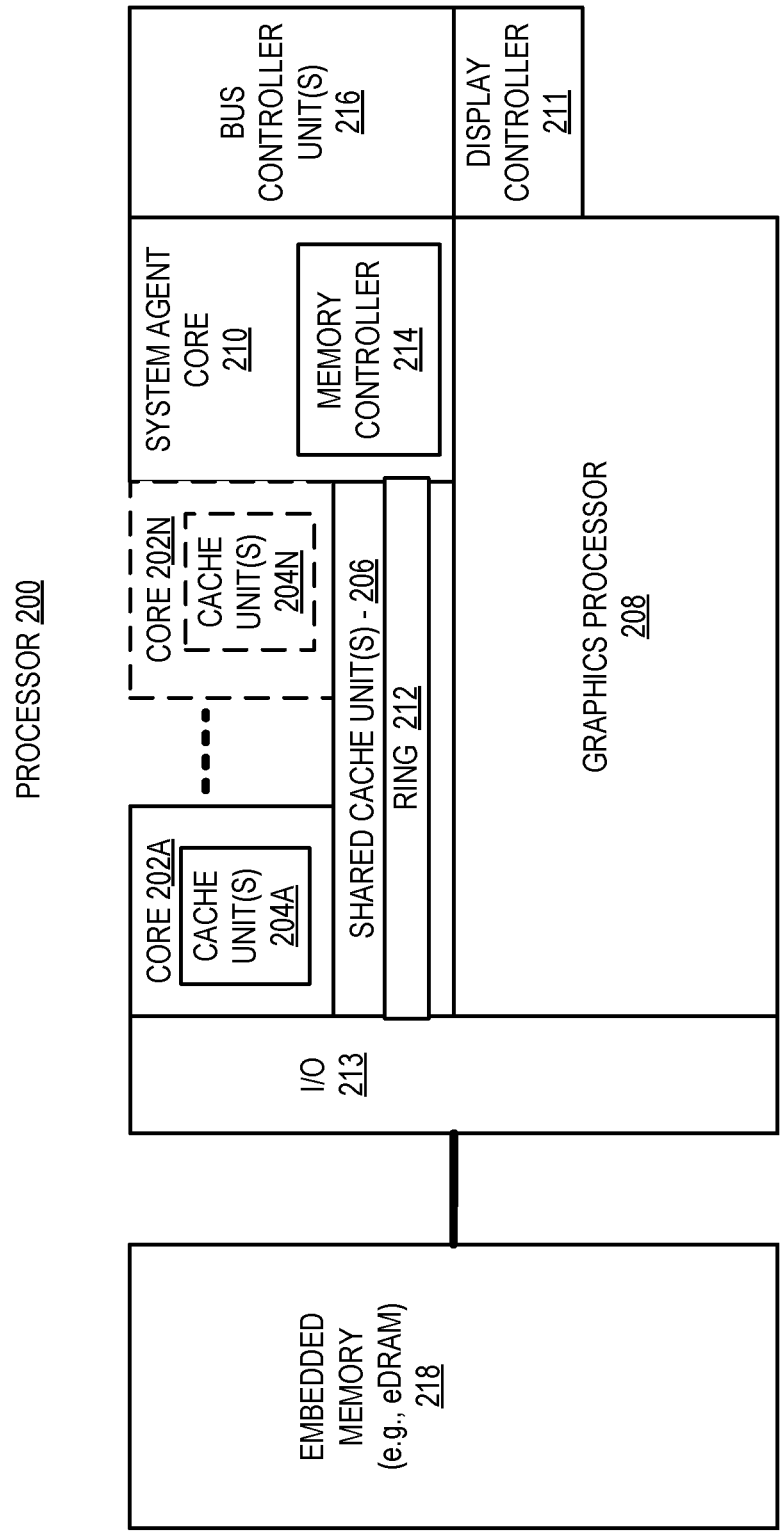
FIG. 2 illustrates a block diagram of a processor having one or more processor cores, an integrated memory controller, and an integrated graphics processor, and with apparatus to improve memory access performance between SLM and SGM, according to some embodiments of the disclosure.

FIG. 2 illustrates a block diagram of an embodiment of processor 200 having one or more processor cores 202A-N, integrated memory controller 214, and integrated graphics processor 208. It is pointed out that those elements of FIG. 2 having the same reference numbers (or names) as the elements of any other figure can operate or function in any manner similar to that described, but are not limited to such.

Processor 200 can include additional cores up to and including additional core 202N represented by the dashed lined boxes. Each of the cores 202A-N include one or more internal cache units 204A-N. In some embodiments, each core also has access to one or more shared cached units 206.

In some embodiments, internal cache units 204A-N and shared cache units 206 represent a cache memory hierarchy within processor 200. The cache memory hierarchy may include at least one level of instruction and data cache within each core and one or more levels of shared mid-level cache, such as a Level-2 (L2), Level-3 (L3), Level-4 (L4), or other levels of cache, where the highest level of cache before external memory is classified as the last level cache (LLC). In some embodiments, cache coherency logic maintains coherency between the various cache units 106 and 204A-N.

In some embodiments, processor 200 may also include a set of one or more bus controller units 216 and system agent 210. The one or more bus controller units manage a set of peripheral buses, such as one or more Peripheral Component Interconnect buses (e.g., PCI, PCI Express). In some embodiments, system agent 210 provides management functionality for the various processor components. In some embodiments, system agent 210 includes one or more integrated memory controllers 214 to manage access to various external memory devices (not shown).

In some embodiments, one or more of the cores 202A-N include support for simultaneous multi-threading. In such embodiments, system agent 210 includes components for coordinating and operating cores 202A-N during multi-threaded processing. In some embodiments, system agent 210 may additionally include a power control unit (PCU), which includes logic and components to regulate the power state of the cores 202A-N and graphics processor 208.

In some embodiments, processor 200 additionally includes a graphics processor 208 to execute graphics processing operations. In some embodiments, graphics processor 208 couples with the set of shared cache units 206, and system agent unit 210, including one or more integrated memory controllers 214. In some embodiments, display controller 211 is coupled with graphics processor 208 to drive graphics processor output to one or more coupled displays. In some embodiments, display controller 211 may be a separate module coupled with the graphics processor via at least one interconnect, or may be integrated within the graphics processor 208 or system agent 210.

In some embodiments, a ring-based interconnect unit 212 is used to couple the internal components of processor 200, however an alternative interconnect unit may be used, such as a point to point interconnect, a switched interconnect, or other techniques, including techniques well known in the art. In some embodiments, graphics processor 208 couples with ring interconnect 212 via I/O link 213.

The example I/O link 213 represents at least one of multiple varieties of I/O interconnects, including an on package I/O interconnect which facilitates communication between various processor components and a high-performance embedded memory module 218, such as an eDRAM module. In some embodiments, each of cores 202-N and graphics processor 208 use embedded memory modules 218 as shared last level cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 can be a part of, or implemented on, one or more substrates using any of a number of process technologies; for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as a system on a chip (SOC) integrated circuit having the illustrated components, in addition to other components.

Figure 3:
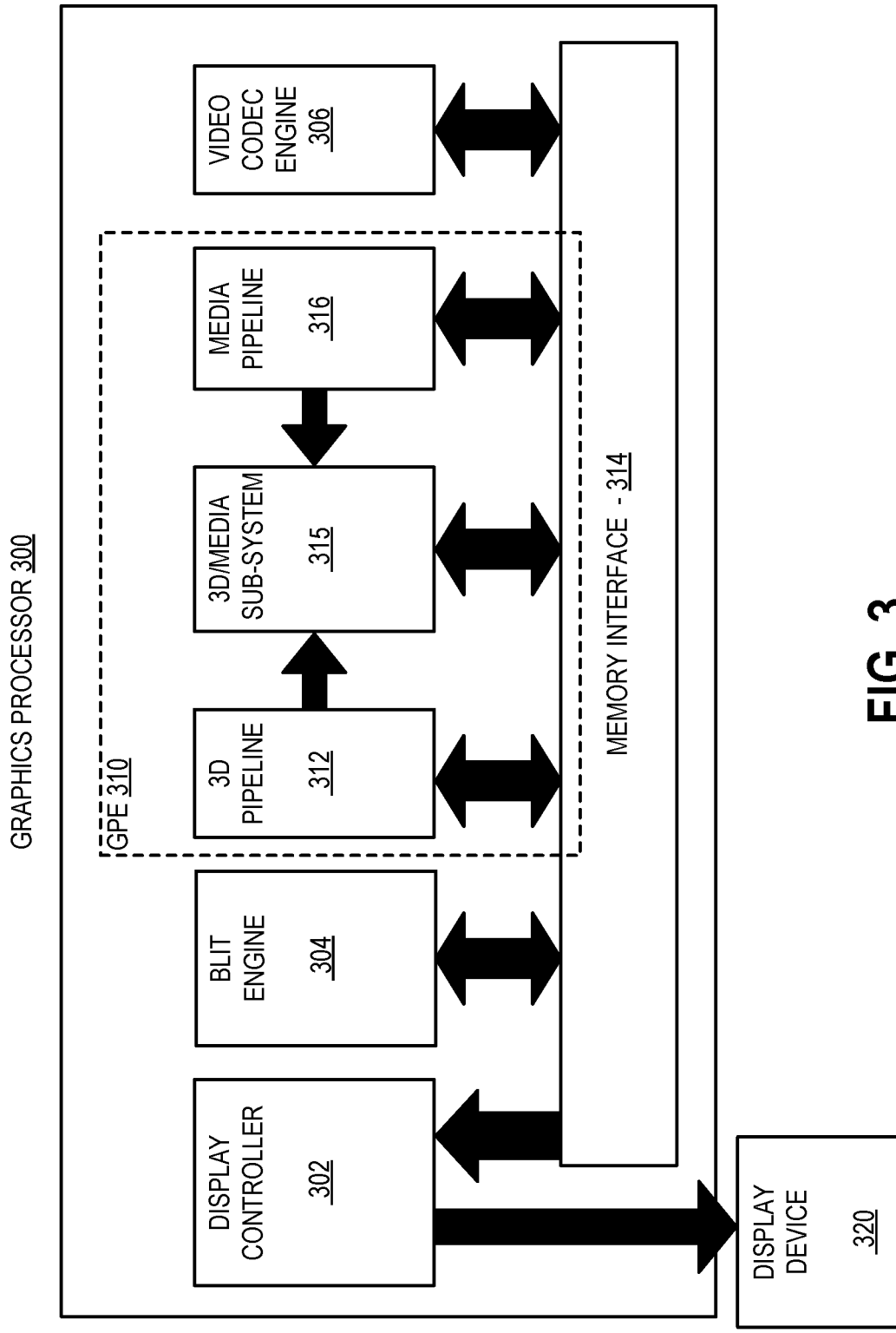
FIG. 3 illustrates a block diagram of a graphics processor which may be a discreet graphics processing unit, or may be a graphics processor integrated with a plurality of processing cores, according to some embodiments of the disclosure.

FIG. 3 illustrates a block diagram of one embodiment of a graphics processor 300, which may be a discrete graphics processing unit, or may be graphics processor integrated with a plurality of processing cores. It is pointed out that those elements of FIG. 3, having the same reference numbers (or names) as the elements of any other figure, can operate or function in any manner similar to that described, but are not limited to such.

In some embodiments, the graphics processor is communicated with via a memory mapped I/O interface to registers on the graphics processor and via commands placed into the processor memory. In some embodiments, graphics processor 300 includes a memory interface 314 to access memory. In some embodiments, memory interface 314 can be an interface to local memory, one or more internal caches, one or more shared external caches, and/or to system memory.

In some embodiments, graphics processor 300 also includes a display controller 302 to drive display output data to a display device 320. In some embodiments, display controller 302 includes hardware for one or more overlay planes for the display and composition of multiple layers of video or user interface elements. In some embodiments, graphics processor 300 includes video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. In some embodiments, 2D graphics operations are performed using one or more components of the graphics-processing engine (GPE) 310. In some embodiments, GPE 310 is a compute engine for performing graphics operations, including three-dimensional (3D) graphics operations and media operations, etc.

In some embodiments, GPE 310 includes a 3D pipeline 312 for performing 3D operations, such as rendering three-dimensional images and scenes using processing functions that act upon 3D primitive shapes (e.g., rectangle, triangle, etc.). In some embodiments, 3D pipeline 312 includes programmable and fixed function elements that perform various tasks within the element and/or spawn execution threads to 3D/Media sub-system 315. While 3D pipeline 312 can be used to perform media operations, an embodiment of GPE 310 also includes media pipeline 316 that is specifically used to perform media operations, such as video post processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In some embodiments, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 4:
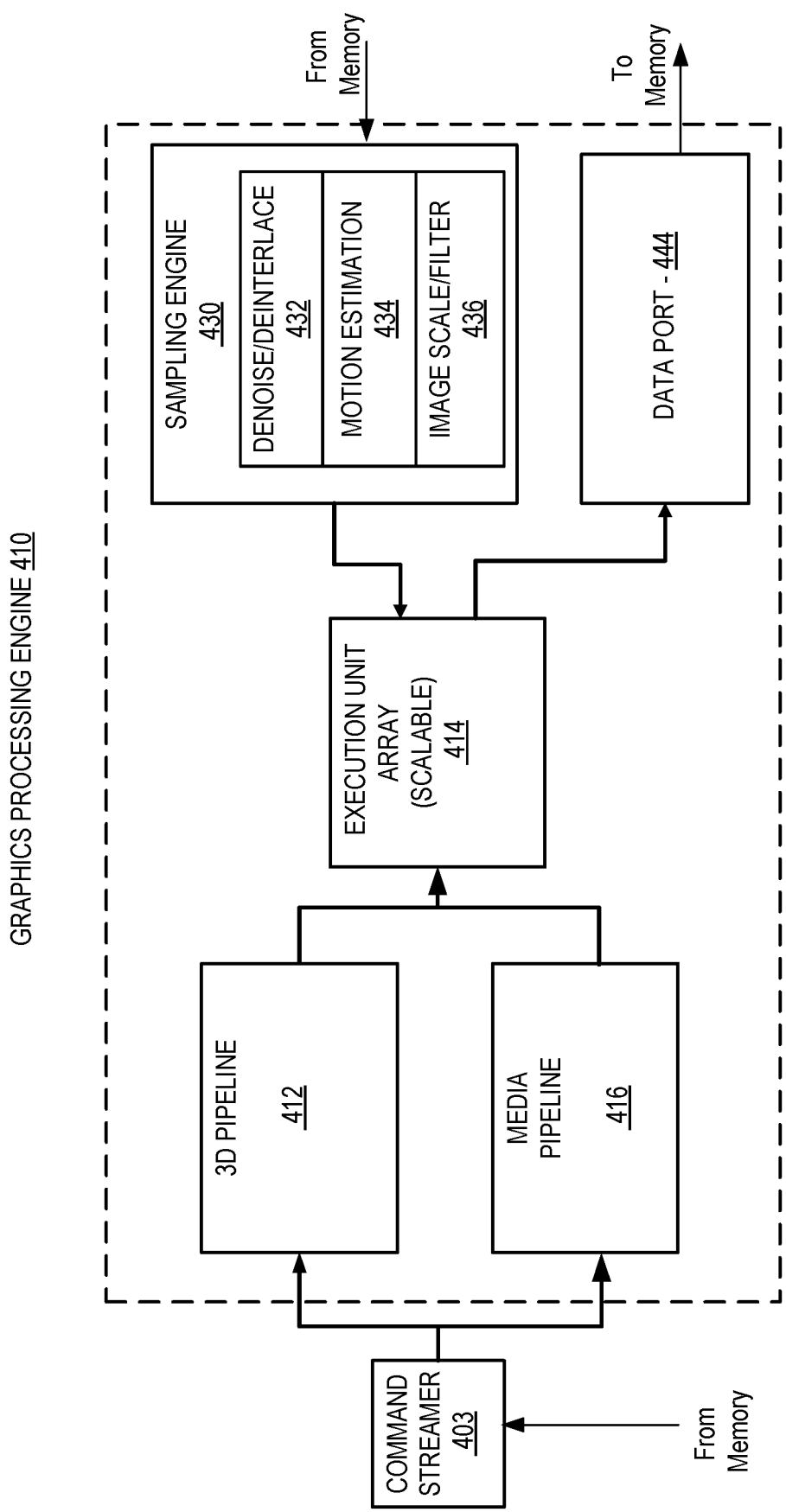
FIG. 4 illustrates a block diagram of a graphics processing engine (GPE) for a graphics processor, according to some embodiments of the disclosure.

FIG. 4 illustrates a block diagram of an embodiment of GPE 410 for a graphics processor. It is pointed out that those elements of FIG. 4 having the same reference numbers (or names) as the elements of any other figure can operate or function in any manner similar to that described, but are not limited to such.

In some embodiments, GPE 410 is a version of the GPE 310 described with reference to FIG. 3. Referring back to FIG. 4, in some embodiments, GPE 410 includes 3D pipeline 412 and media pipeline 416, each of which can be either different from or similar to the implementations of 3D pipeline 312 and media pipeline 316 of FIG. 3.

Referring back to FIG. 4, in some embodiments, GPE 410 couples with command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to execution unit array 414. In some embodiments, execution unit array 414 is scalable, such that the array includes a variable number of execution units based on the target power and performance level of GPE 410.

In some embodiments, sampling engine 430 couples with memory (e.g., cache memory or system memory) and execution unit array 414. In some embodiments, sampling engine 430 provides a memory access mechanism for scalable execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes de-noise/de-interlace module 432, motion estimation module 434, and image scaling and filtering module 436. In some embodiments, de-noise/de-interlace module 432 includes logic to perform one or more of de-noise or de-interlace algorithms on the decoded video data. The de-interlace logic combines alternating fields of interlaced video content into a single frame of video. The de-noise logic reduces or removes data noise from the video and image data. In some embodiments, the de-noise logic and de-interlace logic are motion adaptive and use spatial or temporal filtering based on the amount of motion detected in the video data. In some embodiments, de-noise/de-interlace module 432 includes dedicated motion detection logic (e.g., within motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses the video motion estimation engine 434 to perform operations on the video at the macro-block level that may otherwise be computationally intensive to perform using a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, GPE 410 includes data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 5:
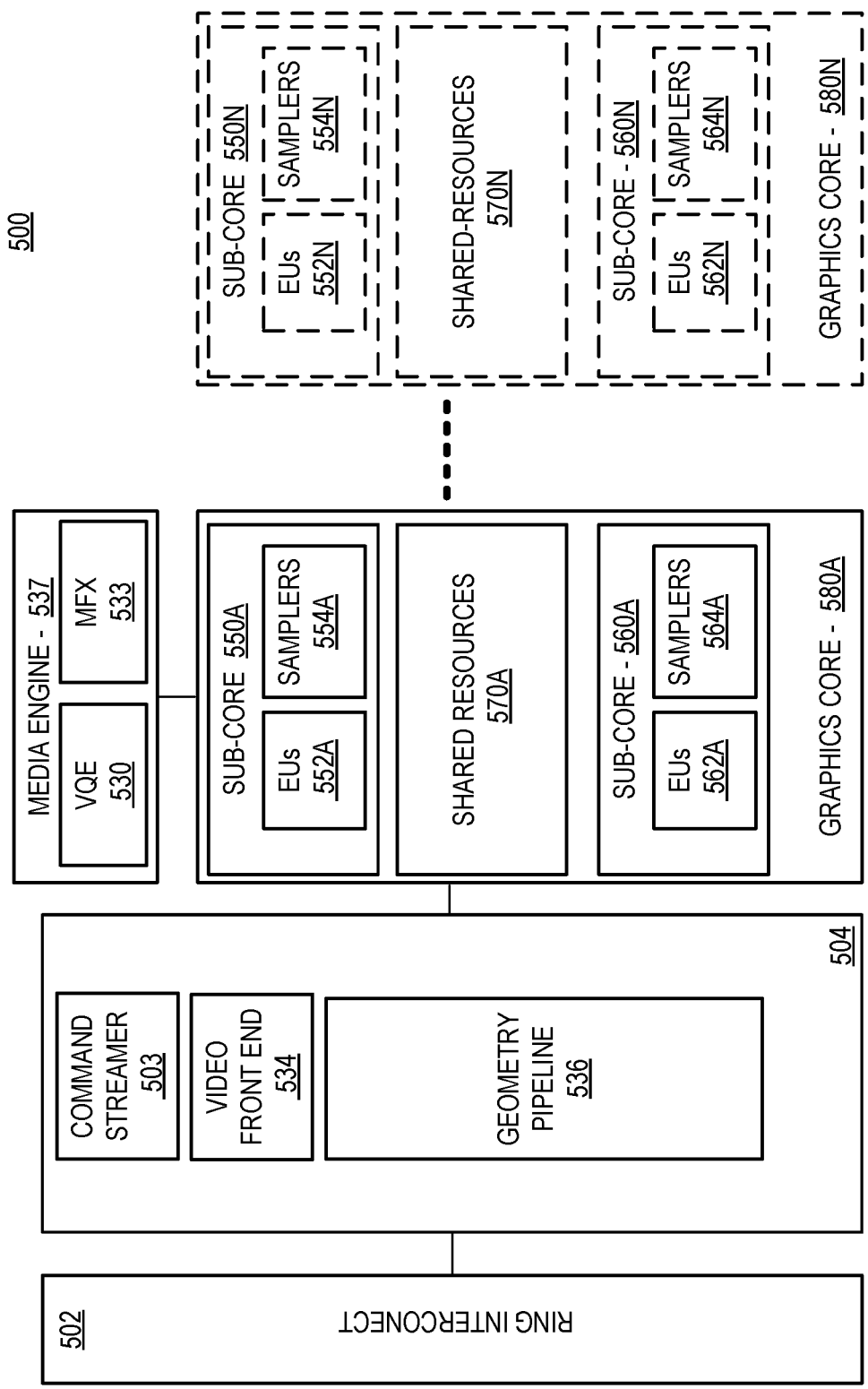
FIG. 5 illustrates a block diagram of another embodiment of a graphics processor related to an execution unit.

FIG. 5 illustrates a block diagram 500 of another embodiment of a graphics processor related to an execution unit. It is pointed out that those elements of FIG. 5 having the same reference numbers (or names) as the elements of any other figure can operate or function in any manner similar to that described, but are not limited to such.

In some embodiments, the graphics processor includes ring interconnect 502, pipeline front-end 504, media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor receives batches of commands via ring interconnect 502. The incoming commands are interpreted by command streamer 503 in the pipeline front-end 504. The graphics processor includes scalable execution logic to perform 3D geometry processing and media processing via graphics core(s) 580A-N. For 3D geometry processing commands, command streamer 503 supplies the commands to geometry pipeline 536. For at least some media processing commands, command streamer 503 supplies the commands to video front end 534, which couples with a media engine 537. In some embodiments, media engine 537 includes a Video Quality Engine (VQE) 530 for video and image post processing and multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In some embodiments, the graphics processor includes graphics core 580A having at least first sub-core 550A and second core sub-core 560A. In another embodiment, the graphics processor is a low power processor with a single sub-core (e.g., 550A). In some embodiments, the graphics processor includes multiple graphics cores 580A-N, each including a set of first sub-cores 550A-N and a set of second sub-cores 560A-N. Each sub-core in the set of first sub-cores 550A-N includes at least first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
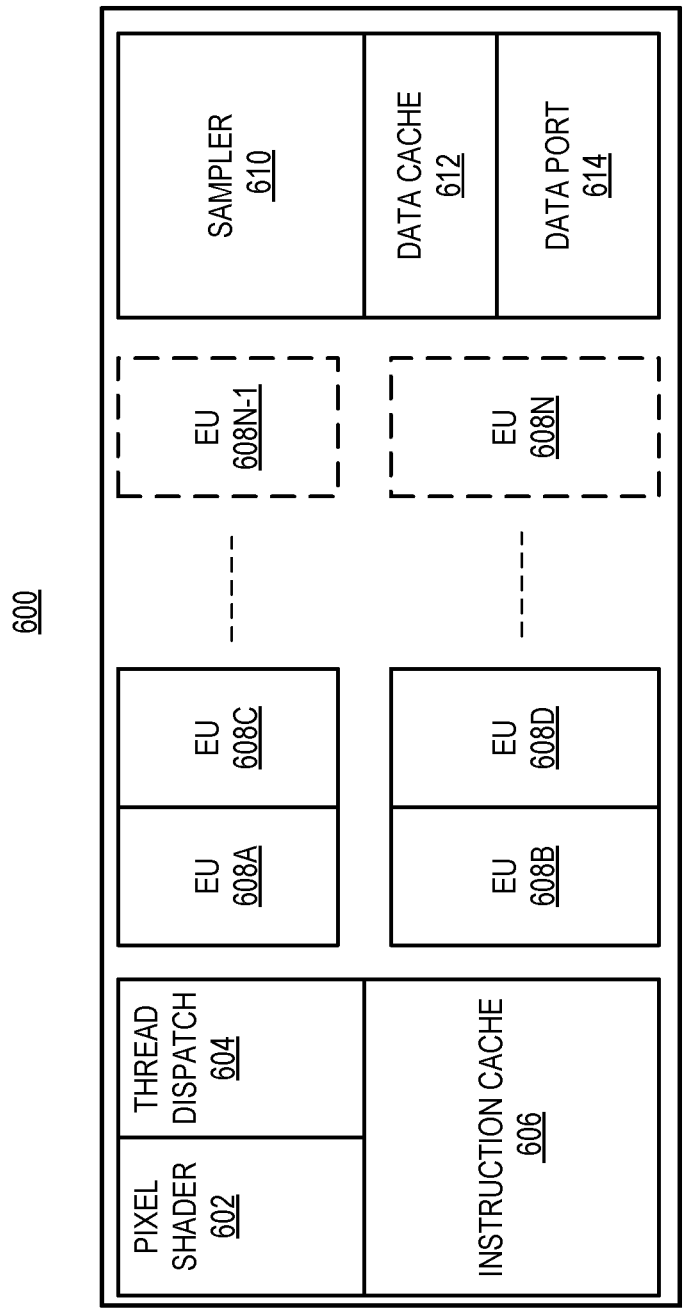
FIG. 6 illustrates thread execution logic including an array of processing elements employed in some embodiments of a GPE.

FIG. 6 illustrates thread execution logic 600 including an array of processing elements employed in one embodiment of a graphics processing engine. It is pointed out that those elements of FIG. 6 having the same reference numbers (or names) as the elements of any other figure can operate or function in any manner similar to that described, but are not limited to such.

In some embodiments, thread execution logic 600 includes pixel shader 602, thread dispatcher 604, instruction cache 606, scalable execution unit array including a plurality of execution units 608A-N, sampler 610, data cache 612, and data port 614. In some embodiments, the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-N. In some embodiments, each execution unit (e.g. 608A) is an individual vector processor capable of executing multiple simultaneous threads and processing multiple data elements in parallel for each thread. In some embodiments, execution unit array 608A-N includes any number of individual execution units.

In some embodiments, execution unit array 608A-N is primarily used to execute "shader" programs. In some embodiments, the execution units in array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600. Referring back to FIG. 6, in some embodiments, thread dispatcher 604 can also process runtime thread spawning requests from the executing shader programs.

Once a group of geometric objects have been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an API-supplied pixel shader program. To execute the pixel shader program, pixel shader 602 dispatches threads to an execution unit (e.g., 608A) via the thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, data port 614 provides a memory access mechanism for thread execution logic 600 output processed data to memory for processing on a graphics processor output pipeline. In some embodiments, data port 614 includes or couples to one or more cache memories (e.g., data cache 612) to cache data for memory access via the data port.

Figure 7:
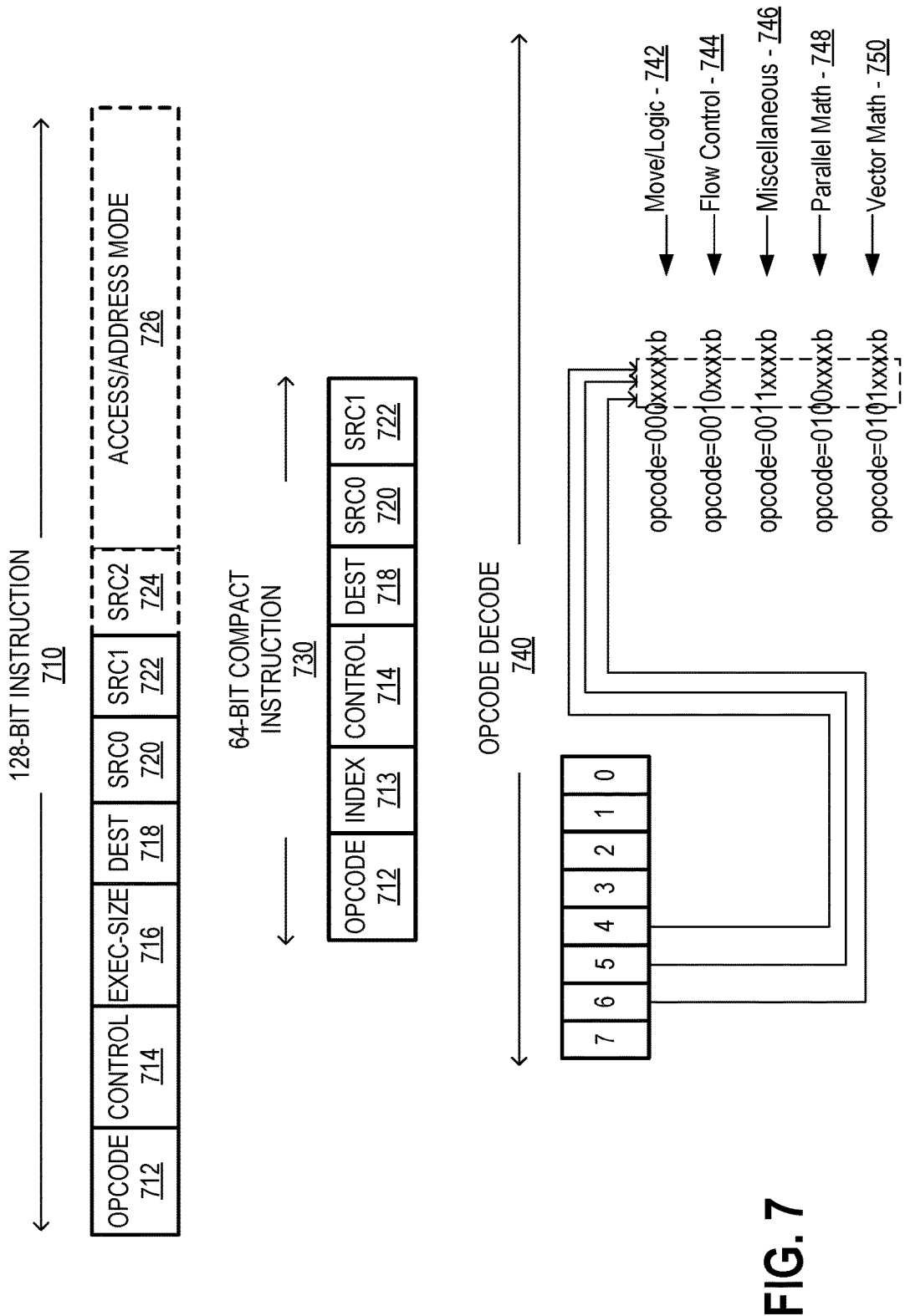
FIG. 7 illustrates a block diagram illustrating a graphics processor execution unit instruction format, according to some embodiments of the disclosure.

FIG. 7 illustrates a block diagram illustrating a graphics processor execution unit instruction format 700, according to some embodiments of the disclosure. In some embodiments, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format 700 described as illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction, the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source (src) operands, src0 722, src1 722, and one destination 718. In some embodiments, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In some embodiments, instructions are grouped-based on opcode bit-fields to simplify opcode decode 740. For an 8-bit opcode, bits 4, 5, and 6 allow the execution unit to determine the type of opcode. The precise opcode grouping shown is just an example. In some embodiments, move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp), etc.,) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
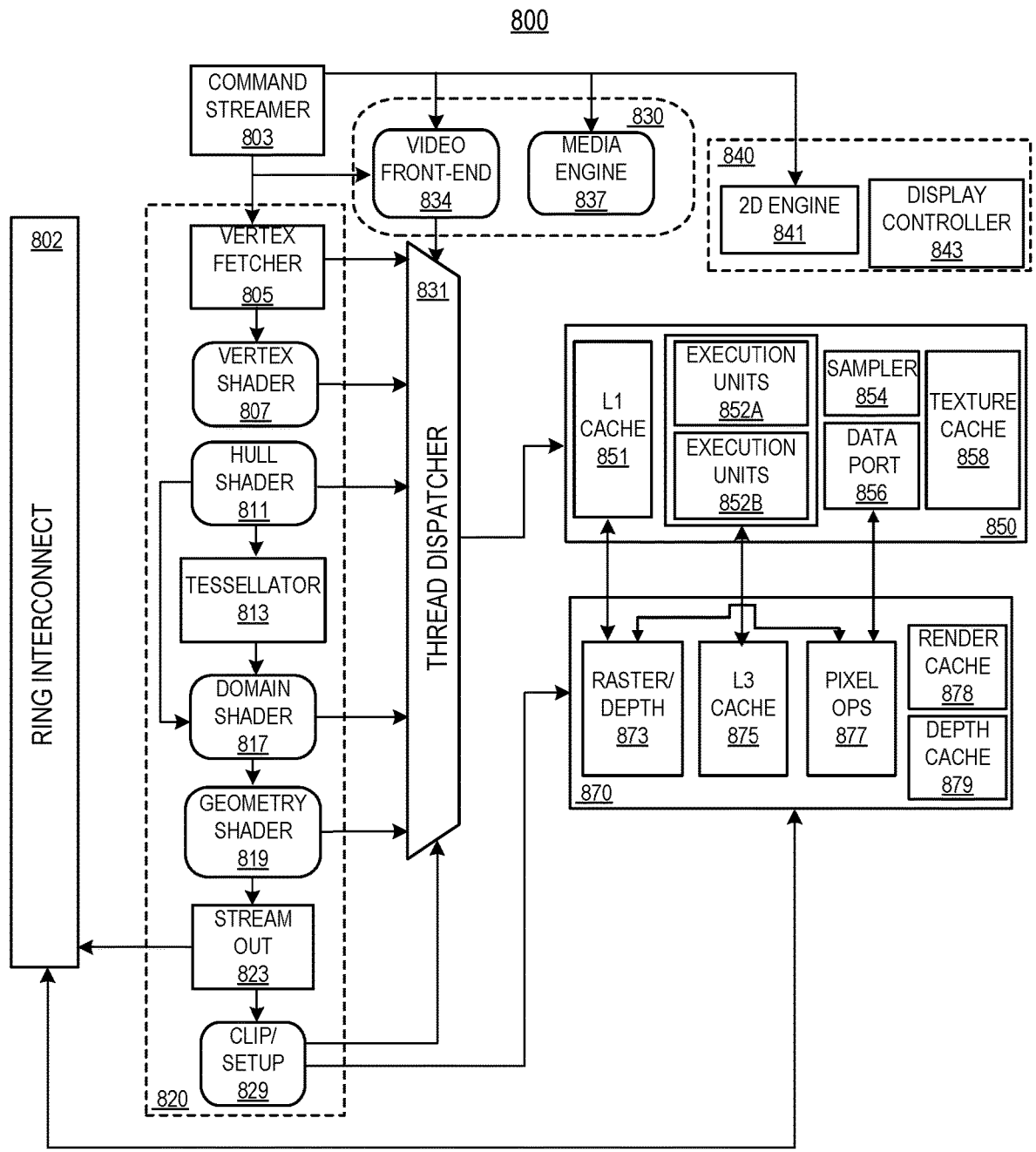
FIG. 8 is a block diagram of another embodiment of a graphics processor which includes graphics pipeline, media pipeline, display engine, thread execution logic, and render output pipeline.

FIG. 8 is a block diagram 800 of another embodiment of a graphics processor, which includes graphics pipeline 820, media pipeline 830, display engine 840, thread execution logic 850, and render output pipeline 870. It is pointed out that those elements of FIG. 8 having the same reference numbers (or names) as the elements of any other figure can operate or function in any manner similar to that described, but are not limited to such.

In some embodiments, the graphics processor is a graphics processor within a multi-core processing system that includes one or more general purpose processing cores. The graphics processor is controlled by register writes to one or more control registers (not shown) or via commands issued to the graphics processor via ring interconnect 802. In some embodiments, ring interconnect 802 couples the graphics processor to other processing components, such as other graphics processors or general-purpose processors. Commands from ring interconnect 802 are interpreted by command streamer 803 which supplies instructions to individual components of graphics pipeline 820 or media pipeline 830.

In some embodiments, command streamer 803 directs the operation of a vertex fetcher 805 component that reads vertex data from memory and executes vertex-processing commands provided by command streamer 803. In some embodiments, vertex fetcher 805 provides vertex data to vertex shader 807, which performs coordinate space transformation and lighting operations to each vertex. In some embodiments, vertex fetcher 805 and vertex shader 807 execute vertex-processing instructions by dispatching execution threads to execution units 852A, 852B via thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. In some embodiments, if tessellation is not used, the tessellation components 811, 813, and 817 can be bypassed.

In some embodiments, the complete geometric objects can be processed by geometry shader 819 via one or more threads dispatched to execution units 852A, 852B, or can proceed directly to clipper 829. In some embodiments, geometry shader 819 operates on the entire geometric objects, rather than the vertices or patches of vertices as in the previous stages of the graphics pipeline. If the tessellation is disabled, geometry shader 819 receives input from vertex shader 807. In some embodiments, geometry shader 819 is programmable by a geometry shader program to perform geometry tessellation if the tessellation units are disabled.

Prior to rasterization, vertex data is processed by clipper 829, which is either a fixed function clipper or a programmable clipper having clipping and geometry shader functions. In some embodiments, rasterizer 873 in render output pipeline 870 dispatches pixel shaders to convert the geometric objects into their per pixel representations. In some embodiments, pixel shader logic is included in thread execution logic 850.

The graphics engine has an interconnect bus, interconnect fabric, or some other interconnect mechanism that allows data and message passing amongst the major components of the graphics engine. In some embodiments, execution units 852A, 852B and associated cache(s) 851, texture and media sampler 854, and texture/sampler cache 858 interconnect via data port 856 to perform memory access and communicate with render output pipeline components of the graphics engine. In some embodiments, sampler 854, caches 851, 858, and execution units 852A, 852B each have separate memory access paths.

In some embodiments, render output pipeline 870 contains a rasterizer and depth test component 873 that converts vertex-based objects into their associated pixel-based representation. In some embodiments, the rasterizer logic includes a windower/masker unit to perform fixed function triangle and line rasterization. An associated render and depth buffer caches 878, 879 are also available in one embodiment. In some embodiments, pixel operations component 877 performs pixel-based operations on the data, though in some instances, pixel operations associated with 2D operations (e.g. bit block image transfers with blending) are performed by 2D engine 841, or substituted at display time by display controller 843 using overlay display planes. In some embodiments, a shared L3 cache 875 is available to all graphics components, allowing the sharing of data without the use of main system memory.

In some embodiments, graphics processor media pipeline 830 includes media engine 837 and video front end 834. In some embodiments, video front end 834 receives pipeline commands from command streamer 803. In some embodiments, media pipeline 830 includes a separate command streamer. In some embodiments, video front-end 834 processes media commands before sending the command to media engine 837. In some embodiments, the media engine includes thread spawning functionality to spawn threads for dispatch to thread execution logic 850 via thread dispatcher 831.

In some embodiments, the graphics engine includes display engine 840. In some embodiments, display engine 840 is external to the graphics processor and couples with the graphics processor via ring interconnect 802, or some other interconnect bus or fabric. In some embodiments, display engine 840 includes 2D engine 841 and display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates the API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9A:
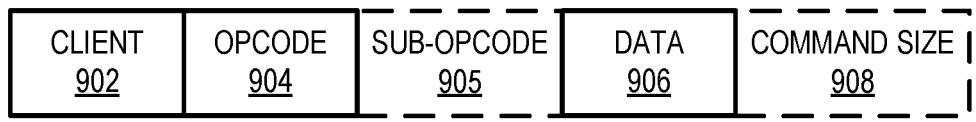
FIG. 9A illustrates a block diagram illustrating a graphics processor command format, according to some embodiments.
Figure 9B:
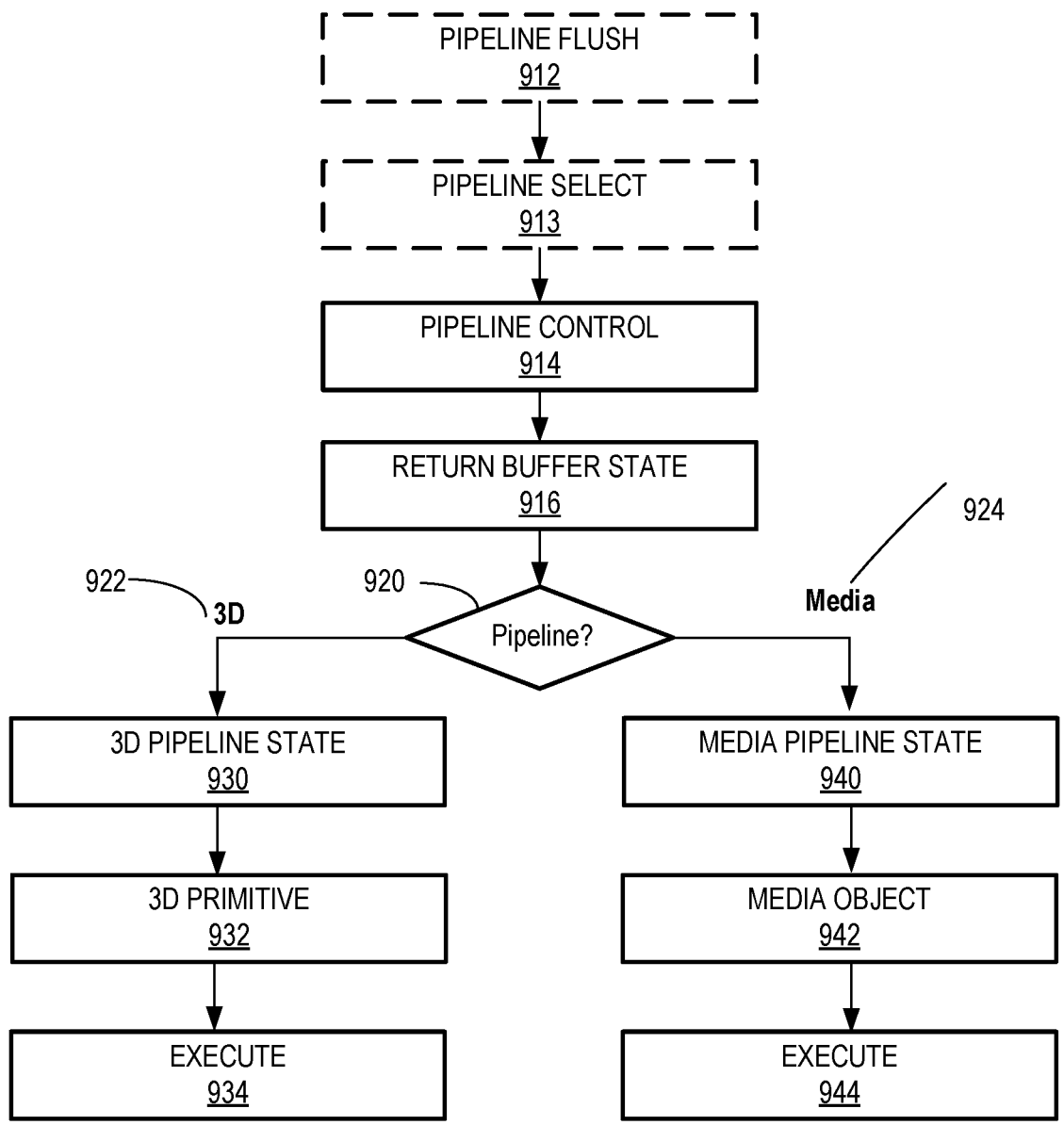
FIG. 9B illustrates a block diagram of a graphics processor command sequence, according to some embodiments of the disclosure.

FIG. 9A illustrates a block diagram illustrating a graphics processor command format 900, according to some embodiments, and FIG. 9B illustrates a block diagram of a graphics processor command sequence 910 according to some embodiments of the disclosure. It is pointed out that those elements of FIGS. 9A-B having the same reference numbers (or names) as the elements of any other figure can operate or function in any manner similar to that described, but are not limited to such.

The solid lined boxes in FIG. 9A illustrate the components that are generally included in a graphics command while the dashed lines include components that are optional or that are only included in a sub-set of the graphics commands. The example graphics processor command format 900 of FIG. 9A includes data fields to identify target client 902 of the command, command operation code (opcode) 904, and relevant data 906 for the command. In some embodiments, sub-opcode 905 and command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads opcode 904 and, if present, sub-opcode 905 to determine the operation to perform. The client unit performs the command using information in data 906 field of the command. For some commands, an explicit command size 908 is expected to specify the size of the command. In some embodiments, the command parser automatically determines the size of at least some of the commands based on the command opcode. In some embodiments, commands are aligned via multiples of a double word.

In some embodiments, flow chart in FIG. 9B shows a sample command sequence 910. Although the blocks in flowchart 910 are shown in a particular order, the order of the actions can be modified. Thus, the illustrated embodiments can be performed in a different order, and some actions/blocks may be performed in parallel. Some of the blocks and/or operations listed are optional in accordance with certain embodiments. The numbering of the blocks presented is for the sake of clarity and is not intended to prescribe an order of operations in which the various blocks must occur. Additionally, operations from the various flows may be utilized in a variety of combinations.

In some embodiments, software or firmware of a data processing system that features an embodiment of the graphics processor uses a version of the command sequence shown to set up, execute, and terminate a set of graphics operations. A sample command sequence is shown and described for illustrative purposes, however embodiments are not limited to these commands or to this command sequence. Moreover, the commands may be issued as batch of commands in a command sequence, such that the graphics processor will process the sequence of commands in an at least partially concurrent manner.

In some embodiments, sample command sequence 910 may begin with pipeline flush command 912 to cause any active graphics pipeline to complete the currently pending commands for the pipeline. In some embodiments, 3D pipeline 922 and media pipeline 924 do not operate concurrently. The pipeline flush is performed to cause the active graphics pipeline to complete any pending commands. In some embodiments, in response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, pipeline select command 913 is used when a command sequence requires the graphics processor to explicitly switch between pipelines. In some embodiments, pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, pipeline control command 914 configures a graphics pipeline for operation and is used to program 3D pipeline 922 and media pipeline 924. In some embodiments, pipeline control command 914 configures the pipeline state for the active pipeline. In some embodiments, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. In some embodiments, return buffer state 916 includes selecting the size and number of return buffers to use for a set of pipeline operations.

The remaining commands in the command sequence differ based on the active pipeline for operations. Based on pipeline determination 920, the command sequence is tailored to 3D pipeline 922 beginning with 3D pipeline state 930, or media pipeline 924 beginning at media pipeline state 940.

The commands for 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via 3D primitive 932 command are forwarded to the vertex fetch function in the graphics pipeline. The vertex fetch function uses 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via execute 934 command or event. In some embodiments, a register write triggers command execution. In some embodiments, execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows media pipeline 924 path when performing media operations. In general, the specific use and manner of programming for media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In some embodiments, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as 3D pipeline 922. A set of media pipeline state commands 940 are dispatched or placed into a command queue before media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline state must be valid before issuing media object command 942. Once the pipeline state is configured and media object commands 942 are queued, media pipeline 924 is triggered via execute 934 command or an equivalent execute event (e.g., register write). Output from media pipeline 924 may then be post processed by operations provided by 3D pipeline 922 or media pipeline 924. In some embodiments, GPGPU operations are configured and executed in a similar manner as media operations.

Figure 10:
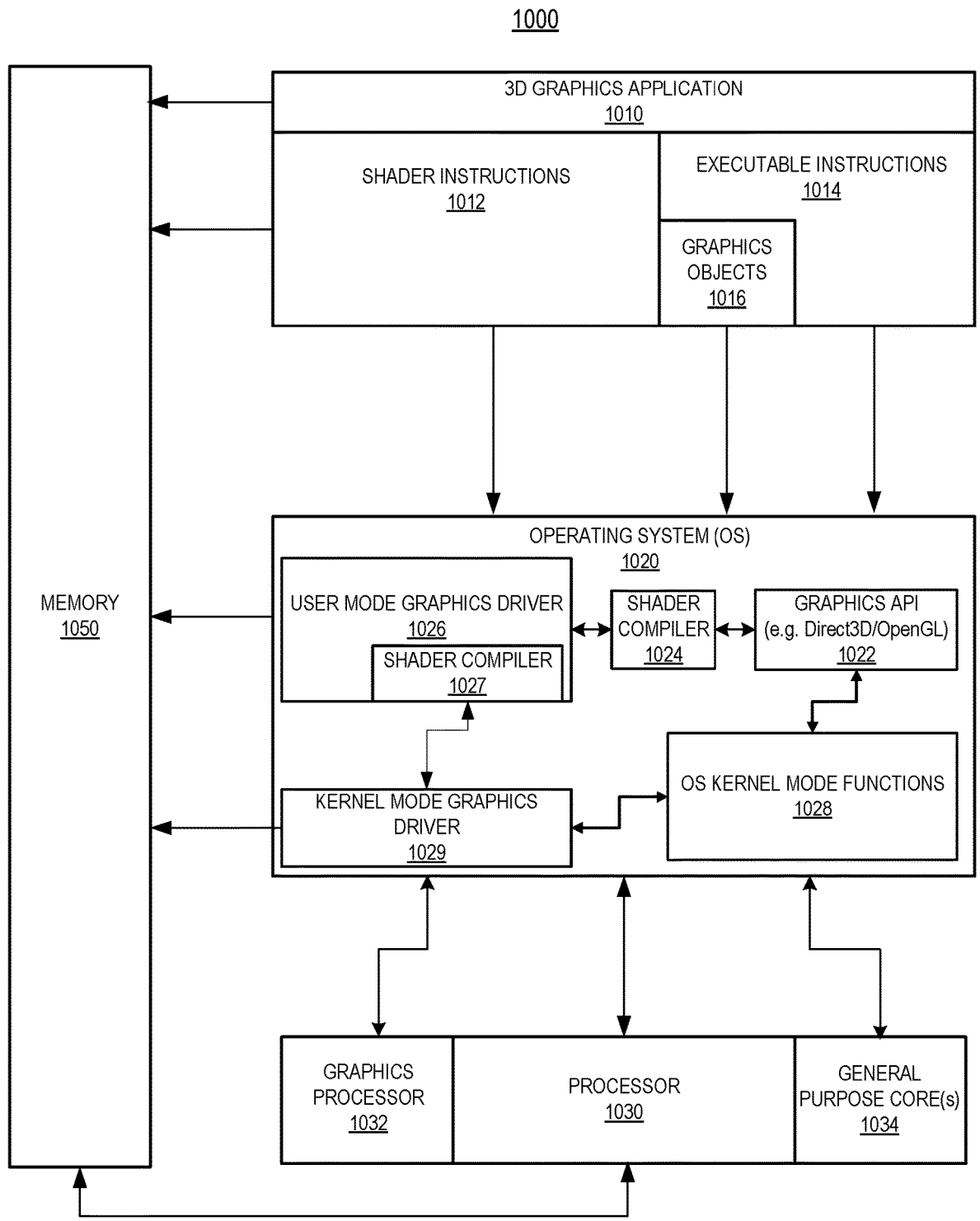
FIG. 10 illustrates a graphics software architecture for a data processing system according to some embodiments of the disclosure.

FIG. 10 illustrates a graphics software architecture 1000 for a data processing system according to some embodiments of the disclosure. It is pointed out that those elements of FIG. 10 having the same reference numbers (or names) as the elements of any other figure can operate or function in any manner similar to that described, but are not limited to such.

In some embodiments, software architecture includes 3D graphics application 1010, operating system 1020, and at least one processor 1030. In some embodiments, processor 1030 includes graphics processor 1032 and one or more general-purpose processor core(s) 1034. In some embodiments, graphics application 1010 and operating system 1020 each execute in system memory 1050 of the data processing system.

In some embodiments, 3D graphics application 1010 contains one or more shader programs including shader instructions 1012. The shader language instructions may be in a high-level shader language, such as the High-Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 may be a Microsoft® Windows® operating system from the Microsoft Corporation, a proprietary UNIX-like operating system, or an open source UNIX-like operating system using a variant of the Linux kernel. When the Direct3D API is in use, operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of 3D graphics application 1010.

In some embodiments, user-mode graphics driver 1026 may contain a back-end shader compiler 1027 to convert shader instructions 1012 into a hardware specific representation. When the OpenGL API is in use, shader instructions 1012 in the GLSL high-level language are passed to user mode graphics driver 1026 for compilation. In some embodiments, user mode graphics driver 1026 uses operating system kernel mode functions 1028 to communicate with kernel mode graphics driver 1029. In some embodiments, kernel mode graphics driver 1029 communicates with graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the disclosure should be measured solely by reference to the claims that follow.

Figure 11:
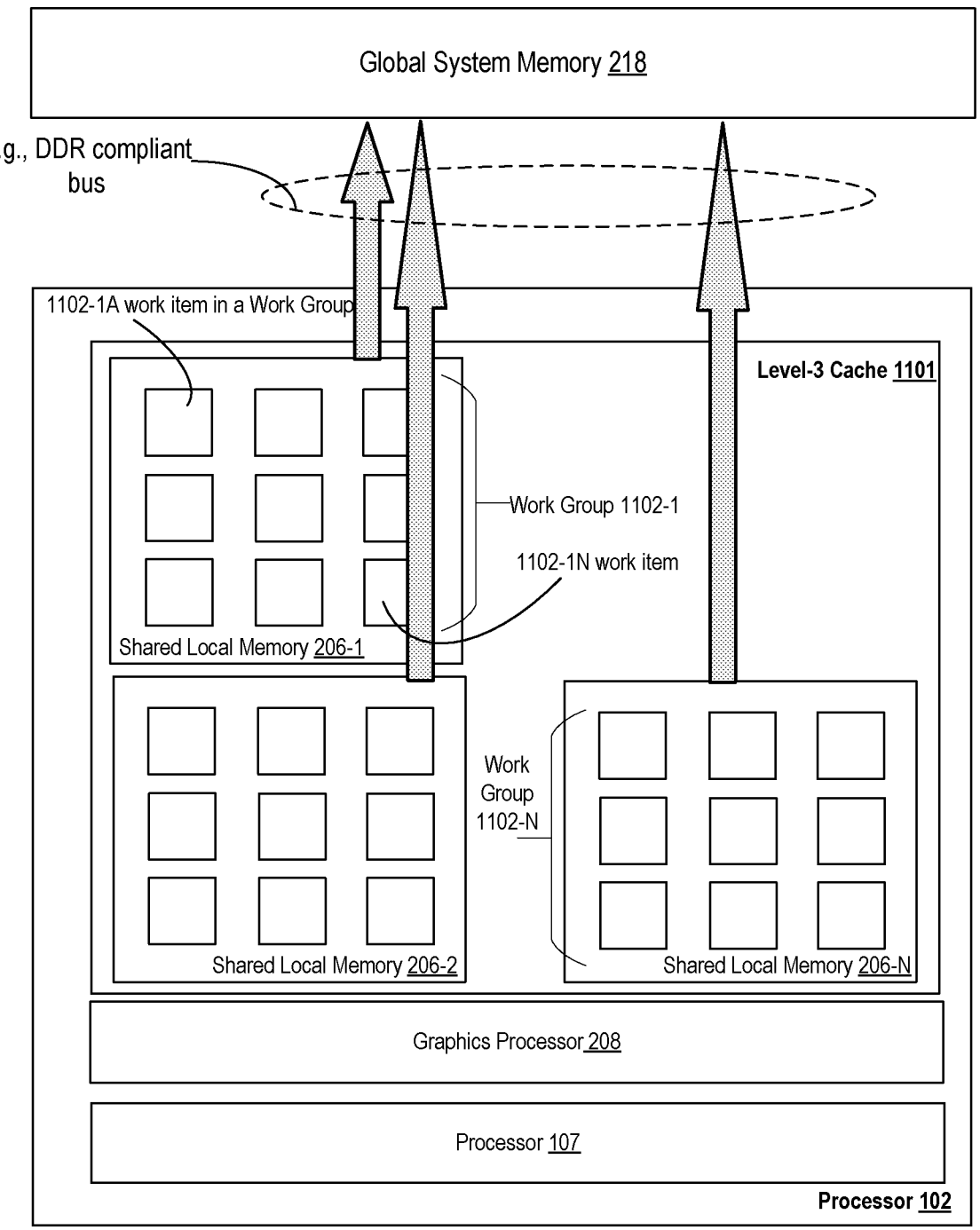
FIG. 11 illustrates architecture of a traditional OpenCL workgroup and memory structure.

FIG. 11 illustrates architecture 1100 of a traditional OpenCL workgroup and memory structure. Architecture 1100 is a simplified architecture showing System Global Memory (SGM) 1101 and Shared Memories 1102-1 through 1103-N. SGM 1101 may be a memory managed by a general processing unit. Here, each Shared Memory is associated with a single workgroup having one or more work items.

In traditional OpenCL memory structure, workgroups share a respective Shared Local Memory (SLM). Workgroups consist of a defined number of work items. These work items are executed by execution units. Memory space within a workgroup is a SLM. Architecture 1100 illustrates 'N' workgroups (e.g., workgroup 1102-1 through 1102-N) and corresponding 'N' SLMs (e.g., SLM 206-1 through 206-N), respectively.

In architecture 1100, computing result by each work item (e.g., 1101-1A through 1101-1N) is gathered and stored in SLM (e.g., 206-1), and then one or more work items in the workgroup (e.g., 1102-1) is responsible to write the data from SLM (e.g., 206-1) to Global System Memory (SGM) 218 via a bus (e.g., a Double Data Rate (DDR) compliant bus as defined by Joint Electron Device Engineering Council (JEDEC) Solid State Technology Association). Since there are many atomic operations, writing from SLM (e.g., 1102-1) to SGM 1101 may take long. Especially, when there is a multiple-processor or multiple devices, performance penalty of atomic operation is worse.

As mentioned above, Threshold Power Point (TPP) is unique for each switchable graphics system. TPP is crossover point above which the dGPU performance is much better and below the TPP the iGPU performance is same as the dGPU but at lower energy consumption. Below is shown lab data that confirms that information, where power/performance of GPU's on a switchable graphics system (KBL-G) is recorded by running a set of applications ranging from low to high loads on the iGPU and same is repeated on the dGPU.

Figure 12:
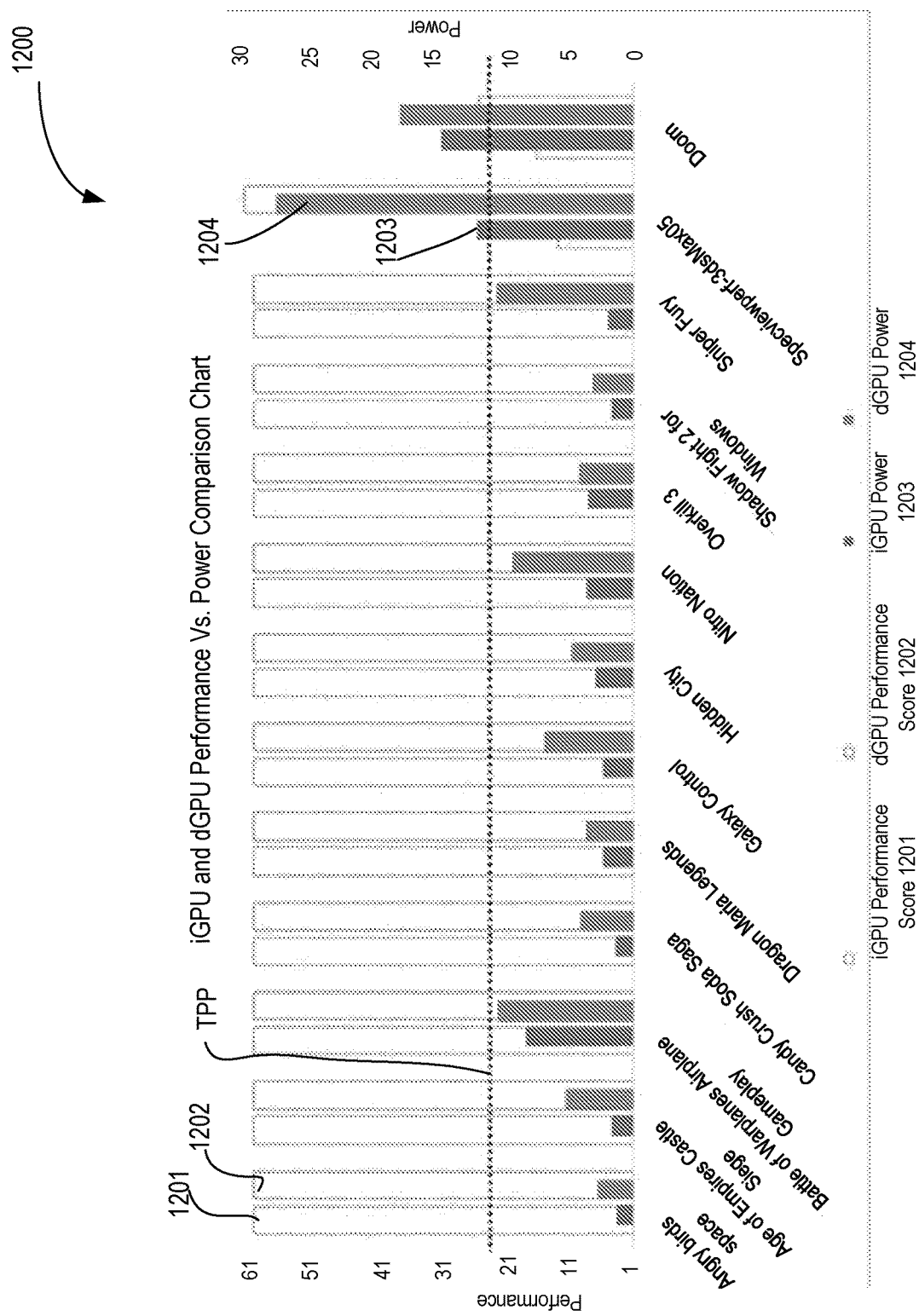
FIG. 12 illustrates a chart showing iGPU and dGPU performance vs. power consumption.
Figure 13:
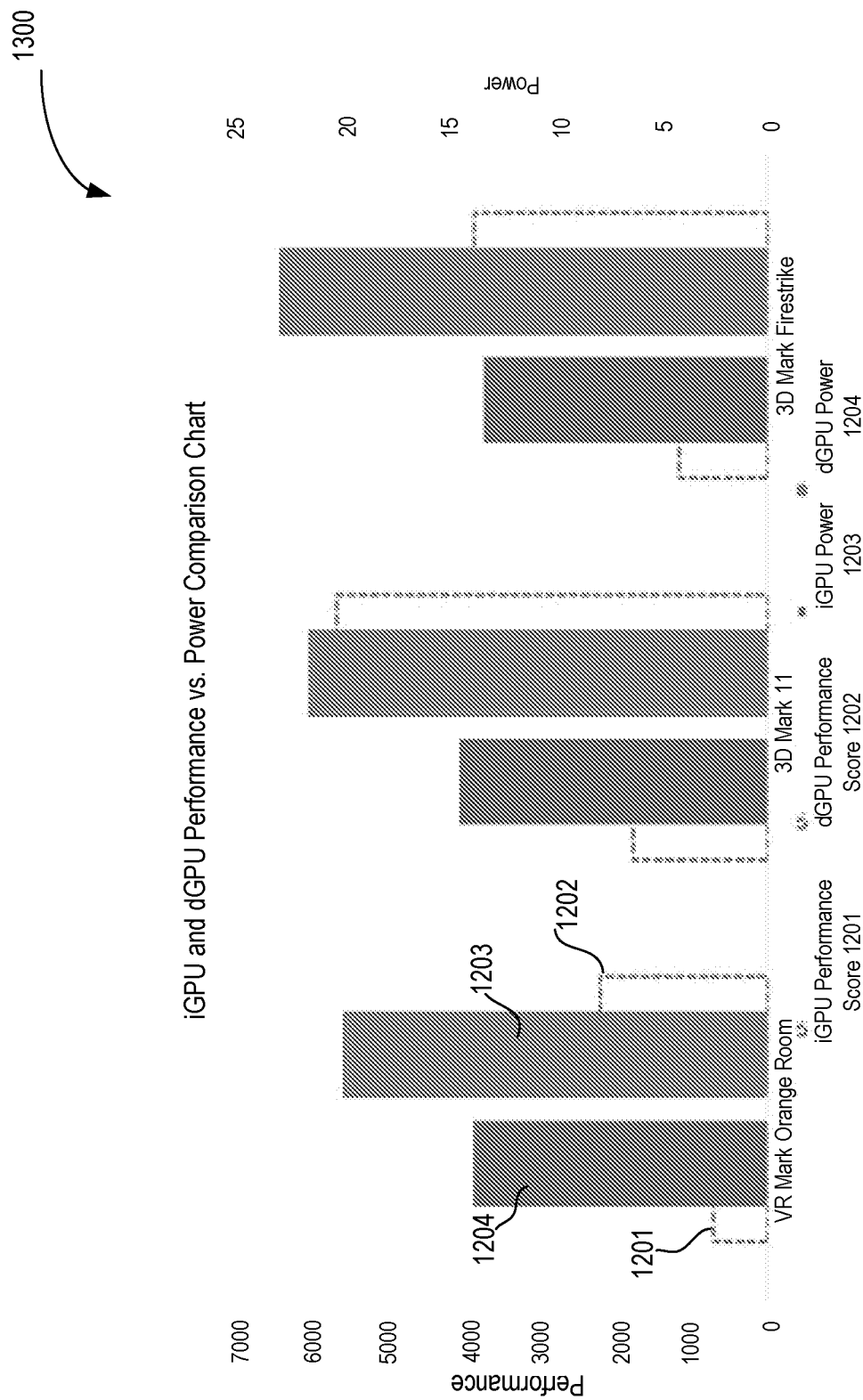
FIG. 13 illustrates a chart showing iGPU and dGPU performance vs. power consumption.

FIG. 12 illustrates a chart 1200 showing iGPU and dGPU performance vs. power consumption. FIG. 13 illustrates chart 1300 showing iGPU and dGPU performance vs. power consumption.

Both these graphs of FIG. 12 and FIG. 13 show power and performance comparison of iGPU and dGPU used for rendering different applications ranging from low power to high power. The dotted vertical bars indicate iGPU performance score 1201 and dGPU performance score 1202. The solid bars indicate iGPU power 1203 and dGPU Power 1204. Based on this data there exists a threshold power point (TPP) of 11 W (dotted horizontal line in graph of FIG. 12) under which iGPU performance score 1201 is same as that of dGPU performance score 1202 but at much lower power (11 applications in the graph of FIG. 12 from left to right). In this case, while rendering applications if GPU power consumption is under 11 W average power then executing applications on iGPU results in lower energy consumption without any compromise on performance. On the contrary, if GPU power consumption (as indicated by iGPU Power 1203 and dGPU power 1204) is higher than 11 W (e.g., 12$^{th}$ and 13$^{th}$ applications on the graph of FIG. 12 and all applications on graph of FIG. 13) then using dGPU for rendering all tasks results in better performance. This threshold power point is unique for each system as it depends on iGPU and dGPU selected for that particular system and it also has dependencies on the system memory, thermal envelopes, power budgets, etc. Note, threshold power point (TPP) of 11 W is just an example, and other values of TPP are determined based on the particular system.

Advantage of the switchable graphics management of various embodiments over existing driver/OS based GPU selection is evident in the graph of FIG. 12 where for 3 applications in the first graph (e.g., Galaxy Control, Sniper Fury, Battle of War Planes) existing driver/OS based implementation selects dGPU for rendering whereas using iGPU for rendering these applications results in same performance but at much lower energy. For example, for Galaxy Control application, dGPU results in performance score 1202 of 61 at an average power consumption of approx. 6 W, whereas iGPU consumes average power of approximately 3 W and results in same performance score of 61.

Figure 14A:
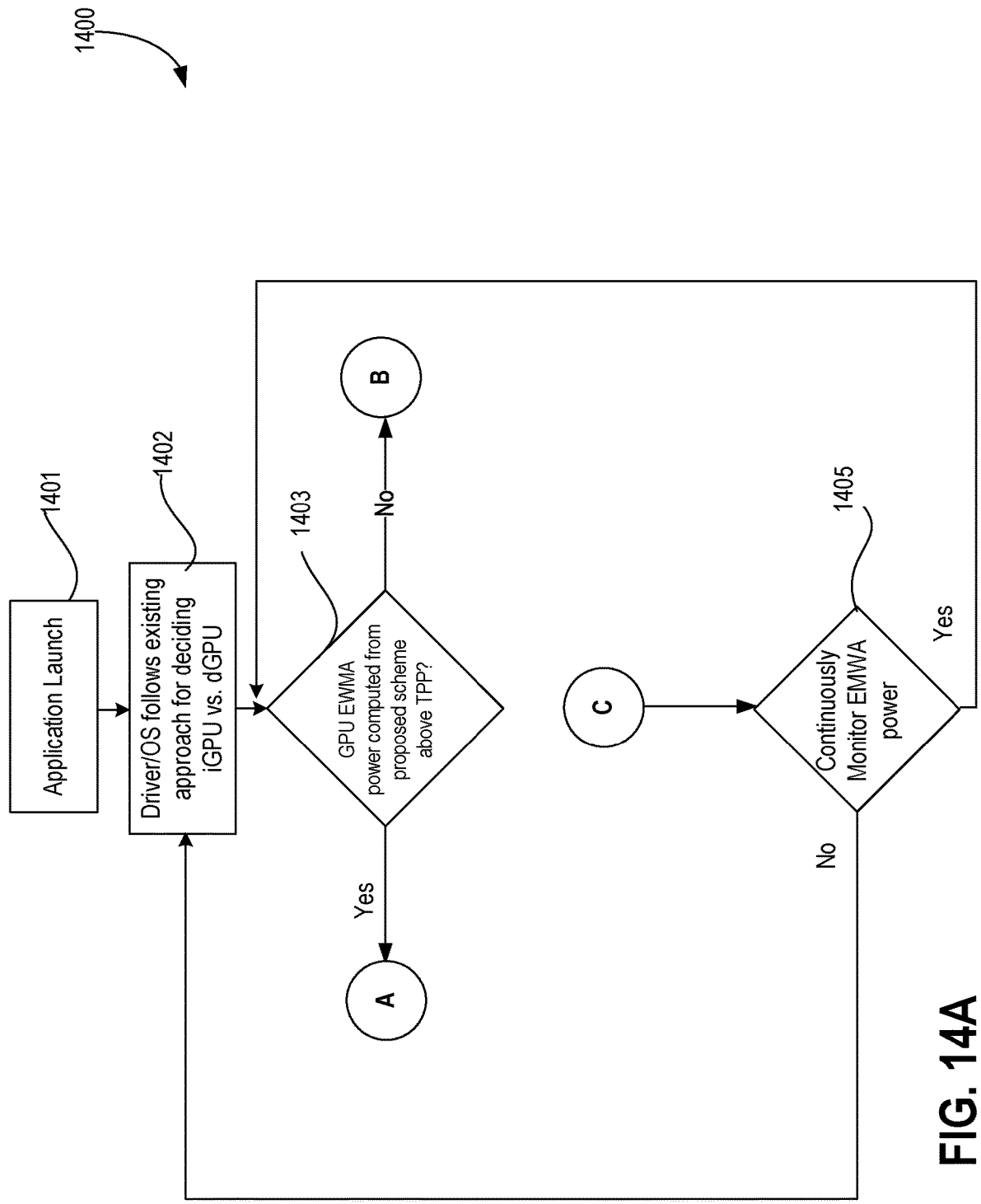
FIGS. 14A-B illustrate flowcharts, respectively, of the switchable graphics power management scheme, in accordance with some embodiments.
Figure 14B:
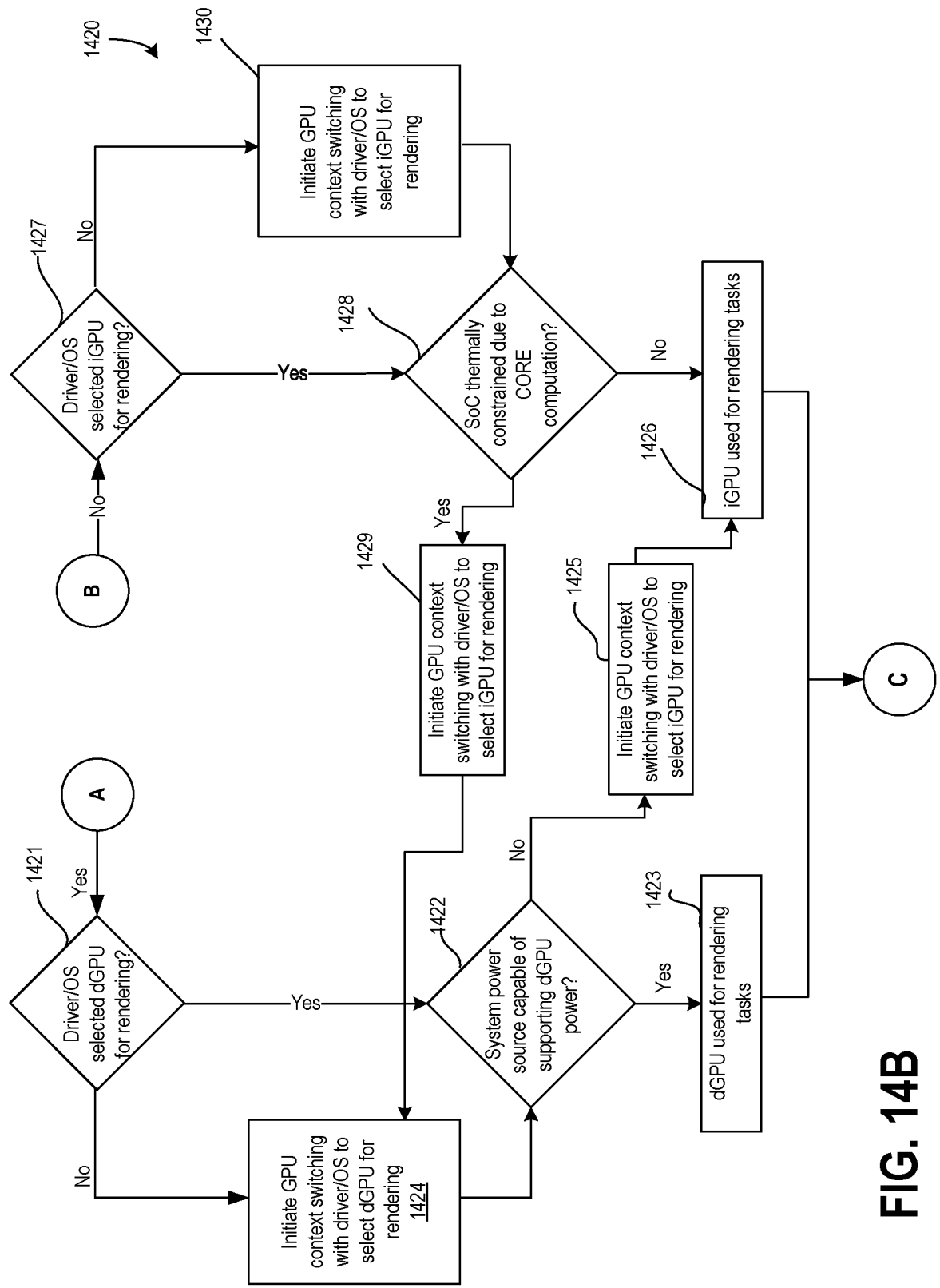

FIGS. 14A-B illustrate flowcharts 1400 and 1420, respectively, of the switchable graphics power management scheme, in accordance with some embodiments. The switchable graphics power management scheme of various embodiments uses inputs from the system. Examples of system inputs include power and performance characterization of iGPU and dGPU for few standard applications, and real-time information of system parameters like SoC thermals, system power source capabilities. Flowcharts 1400 and 1420 use the GPU power/performance information to decide on the right GPU (iGPU and dGPU) for rendering.

Power and performance characterization of iGPU and dGPU for few standard applications is used to find out GPU's threshold power point as shown in graphs of FIG. 12 and FIG. 13. Flowcharts of FIGS. 14A-B use this threshold power point (TPP) to further decide on the right GPU (e.g., iGPU or dGPU) for different tasks and use cases. Few standard applications can be defined which stress GPUs from low to high loads and OEM/ODM (original equipment manufacturer/original design manufacturer) use these applications to find out the threshold power point for that system. The threshold power point information is then passed on to the graphics power management algorithm (e.g., through BIOS or Embedded Controller on platform). The graphics power management algorithm of FIGS. 14A-B can be performed by software, hardware, or a combination of them. In some embodiments, graphics power management algorithm is performed by a driver in the OS or kernel space. In some embodiments, TTP and other parameters of graphics power management algorithm are controlled by user software space (a level of abstraction above the operation system space). In some embodiments, graphics power management algorithm is executed by a power management unit of graphics processor or system-on-chip.

In some embodiments, graphics power management algorithm receives real-time information (e.g., power telemetry) of system parameters like SoC thermals, system power source capabilities, etc. In some cases, the power telemetry may be readily available information and may not need new hardware to acquire them. The flowcharts show switchable graphics management control flow where it looks at average power consumed by GPU along with other system parameters (power, thermal envelopes etc.) to decide on right GPU for rendering tasks, in accordance with some embodiments.

The scheme of FIGS. 14A-B can also learn from power profiles of applications rendered using existing driver/OS based method of switchable GFX and use this profile information to decide on the right GPU selection during relaunch of applications in future. Switching of GPU's for optimized GPU usage based on the scheme of FIGS. 14A-B can be implemented in many ways. Two ways are described. One way is to dynamically switch GPU's while rendering tasks through smart interaction between drivers and the OS. This ensures seamless switch between GPU's without any sort of visual glitch to user.

When an application is launched (as shown by block 1401), the process starts with the existing approach with driver/OS deciding on GPU (e.g., iGPU and dGPU) for rendering as indicated by block 1402. Once the GPU execution units start processing the data, the scheme of various embodiments will get GPU power consumption information from voltage regulator telemetry and/or other sources (e.g., scan chain, design-for-test (DFT) circuits etc.). In some embodiments, the scheme of various will compute Exponentially Weighted Moving Average (EWMA) on this real-time power data (from voltage regulator telemetry and or other sources) to find out an average power consumption of the GPU. EWMA can be computed as follows:

$$EWMA_t = EWMA_{t-1} + \Delta t/\tau(P_t - EWMA_{t-1}) \quad (1)$$

EWMA is a method to find an average value of dynamic data by considering instantaneous (t) value along with weighing in the previous (t−1) data. Typically, most of the graphics workloads are bursty in nature requiring high power for short duration of time. So, the problem of frequent GPU switching can be addressed by EWMA method of averaging. This method of averaging helps to find such event durations in applications, which will have frequent high burst power consumption or events with high duty cycle of high-power consumption. The scheme of various embodiments samples this data periodically to understand the duty cycle of the power profile.

Based on the duty cycle of the power profile, if the task has a power profile which has frequent back and forth crossover of threshold power point (TPP) then at block 1403 a determination is made whether GPU EWMA power is above the TPP. If the GPU EWMA power is above the TPP, the process proceeds to block 1421 as indicated by identifier A to use dGPU for rendering thus ensuring there are no frequent context switching between iGPU/dGPU which also ensures no compromise in performance. If the GPU EWMA power is not above the TPP, the process proceeds to block 1427 as indicated by identifier B to use iGPU for rendering. If workload on the GPU is bursty resulting in frequent back and forth transition of EWMA power across threshold power point, then at block 1403 the scheme is to look at duty cycle of EWMA power profile and accordingly select a GPU for rendering thus avoiding frequent context switching.

At block 1421, a determination is made regarding whether the driver and/or OS selected dGPU for rendering. If the driver and/or OS selected dGPU for rendering, the process proceeds to block 1422. At block 1422, a determination is made regarding capability of the system power source. If the system power source (e.g., voltage regulator) is capable of supporting power consumption of the dGPU, the process proceeds to block 1423 where dGPU is used for rendering tasks. If the system power source is not capable of supporting power consumption of the dGPU, the process proceeds to block 1425. At block 1425, GPU context switching is initiated with driver and/or OS to select iGPU for rendering. The process then proceeds to block 1426 where iGPU is used for rendering tasks. If at block 1421 the driver and/or OS does not select dGPU for rendering, the process proceeds to block 1424. At block 1424, GPU context switching is initiated with driver and/or OS to select dGPU for rendering. The process then proceeds to block 1422 and the system power source capability is determined as discussed herein.

At block 1427, a determination is made regarding whether the driver and/or OS selected iGPU for rendering. If the driver and/or OS selected iGPU for rendering, the process proceeds to block 1428. At block 1428, a determination is made regarding the thermal constraint of the SoC. If the SoC is thermally constrained due to computations of the processor core of the SoC, the process proceeds to block 1429 where the GPU initiates context switching with the driver and/or OS to select iGPU for rendering. The process then proceeds to block 1424. Thermal constraint can be determined using data or measurement from thermal sensors and/or power management unit. A thermal constraint may correspond to a temperature of the processor core which is substantially the throttling temperature (e.g., temperature at which the processor core is throttled). If the SoC is not thermally constrained due to computations of the processor core(s) of the SoC, the process proceeds to block 1426 where iGPU is used for rendering the tasks. If the driver and/or OS does not select iGPU for rendering, the process proceeds to block 1430. At block 1430, the GPU initiates context switching with driver and/OS to select iGPU for rendering. The process then proceeds to block 1428.

In some embodiments, a machine-readable media is provided having instructions stored thereon that when executed cause a graphics processing unit (GPU) to perform a method for selecting one of iGPU or dGPU for rendering a task. The method comprises stressing the GPU with various applications to determine a thermal power point (TPP); adaptively applying performance per watt information of both an integrated graphics processing unit (iGPU) and a discrete graphics processing unit (dGPU), and the TPP to determine which one of the iGPU or dGPU is to execute a rendering task; and selecting one of the iGPU or dGPU is to execute the rendering task according to the performance per watt information and the TPP.

In some embodiments, the machine-readable media includes instructions stored thereon that when executed cause the GPU to perform the method comprising receiving telemetry information before determining which one of the iGPU or dGPU is to execute the rendering task. In some embodiments, the machine-readable media includes instructions stored thereon that when executed cause the GPU to perform the method comprising determining an average power consumption of the GPU via instantaneous power data and previous power data received by the telemetry information. In some embodiments, the machine-readable media includes instructions stored thereon that when executed cause the GPU to perform the method comprising determining whether the average power consumption is greater than the TPP, and if the average power consumption is greater than the TPP, selecting the dGPU to execute the rendering task.

In some embodiments, the machine-readable media includes instructions stored thereon that when executed cause the GPU to perform the method comprising selecting the iGPU to execute the rendering task if the average power consumption is less than the TPP. In some embodiments, the machine-readable media including instructions stored thereon that when executed cause the GPU to perform the method comprising: determining which one of the iGPU or dGPU is to execute the rendering task in accordance with a duty cycle of the average power consumption if the average power consumption has a number of low and high transitions above a threshold number. In some embodiments, the machine-readable media including instructions stored thereon that when executed cause the GPU to perform the method comprising requesting an operating system or driver to select the iGPU for rendering the task if it is determined that a power source is not capable of supporting power consumption of the dGPU. In some embodiments, the machine-readable media including instructions stored thereon that when executed cause the GPU to perform the method comprising requesting an operating system or driver to select the dGPU for rendering the task if it is determined that a processor core of the GPU is thermally constrained.

Figure 15:
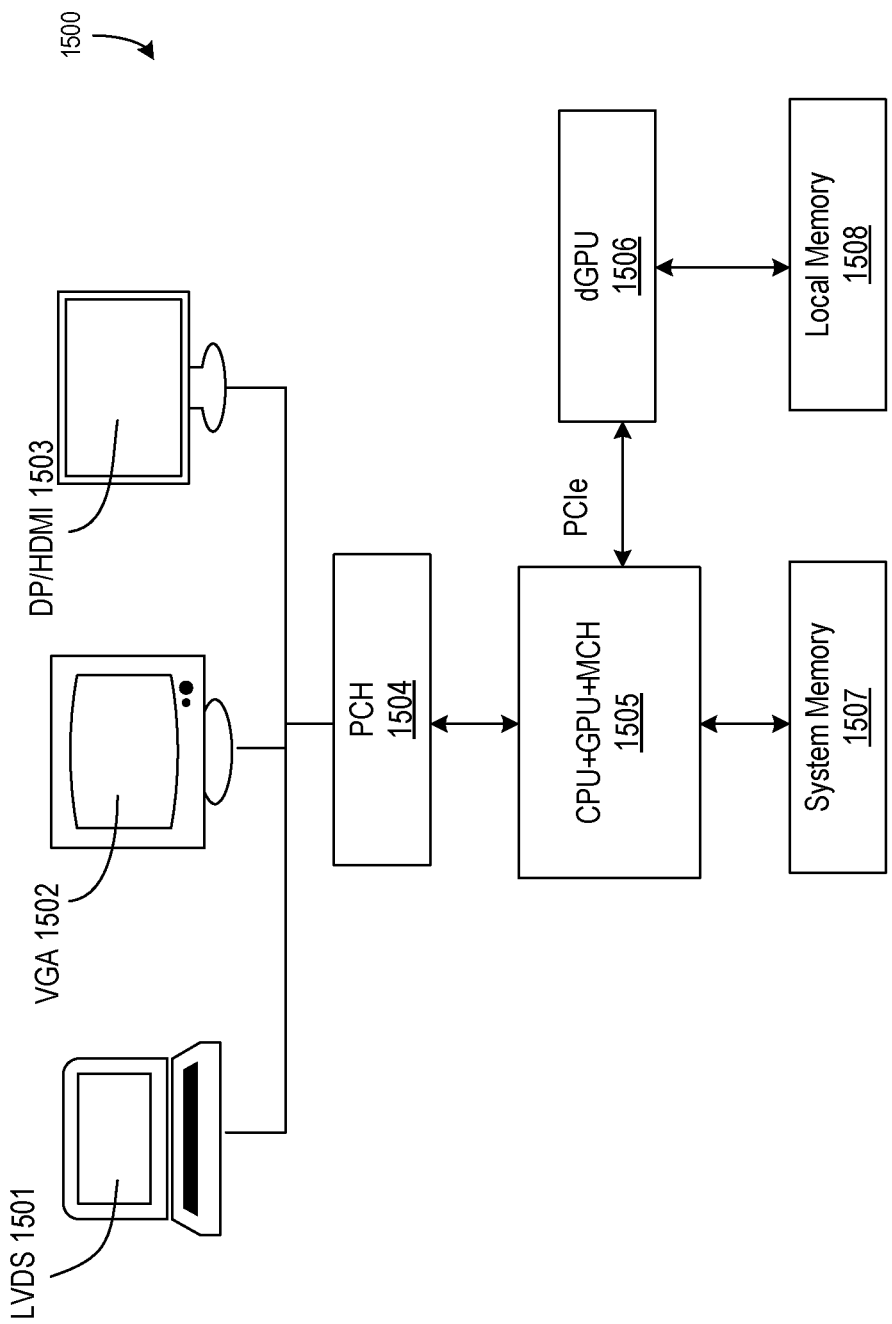
FIG. 15 illustrates computer system, in accordance with some embodiments.

FIG. 15 illustrates a simplified computer system 1500, in accordance with some embodiments. System 1500 shows displays such as LVDS 1501 (low voltage differential signaling, flat panel display link, liquid crystal display), visual graphics system (VGS) 1502, and display port (DP) or high definition multimedia interface (HDMI) 1503 that are connected to CPU 1505 (which may include the GPU and memory controller hub (MCH)) via platform controller hub (PCH) 1504. dGPU 1506 is connected to CPU 1505 via PCIe (peripheral component interconnect express). System memory 1507 is connected to CPU 1505 while local memory 1508 is connected to dGPU 1506. The displays are connected via display connections to the iGPU display pipes. Regardless of which display adapter processes the data, display contents will be pushed through iGPU display pipes. This enables seamless dynamic context switching between GPU's. System 1500 shows the that switchable graphics principle helps to seamlessly transition between iGPU vs dGPU without changing the display pipe/port.

If system uses different display architecture then another method for GPU switch is that, after finding the right GPU for rendering, the scheme of FIGS. 14A-B will indicate to a user through an OS pop up message if user wants to switch to the optimized GPU for rendering. If the user decides to switch GPU then driver/OS will take further action switch GPU. This is simpler option in terms of software driver-OS interactions but may not be seamless.

Figure 16:
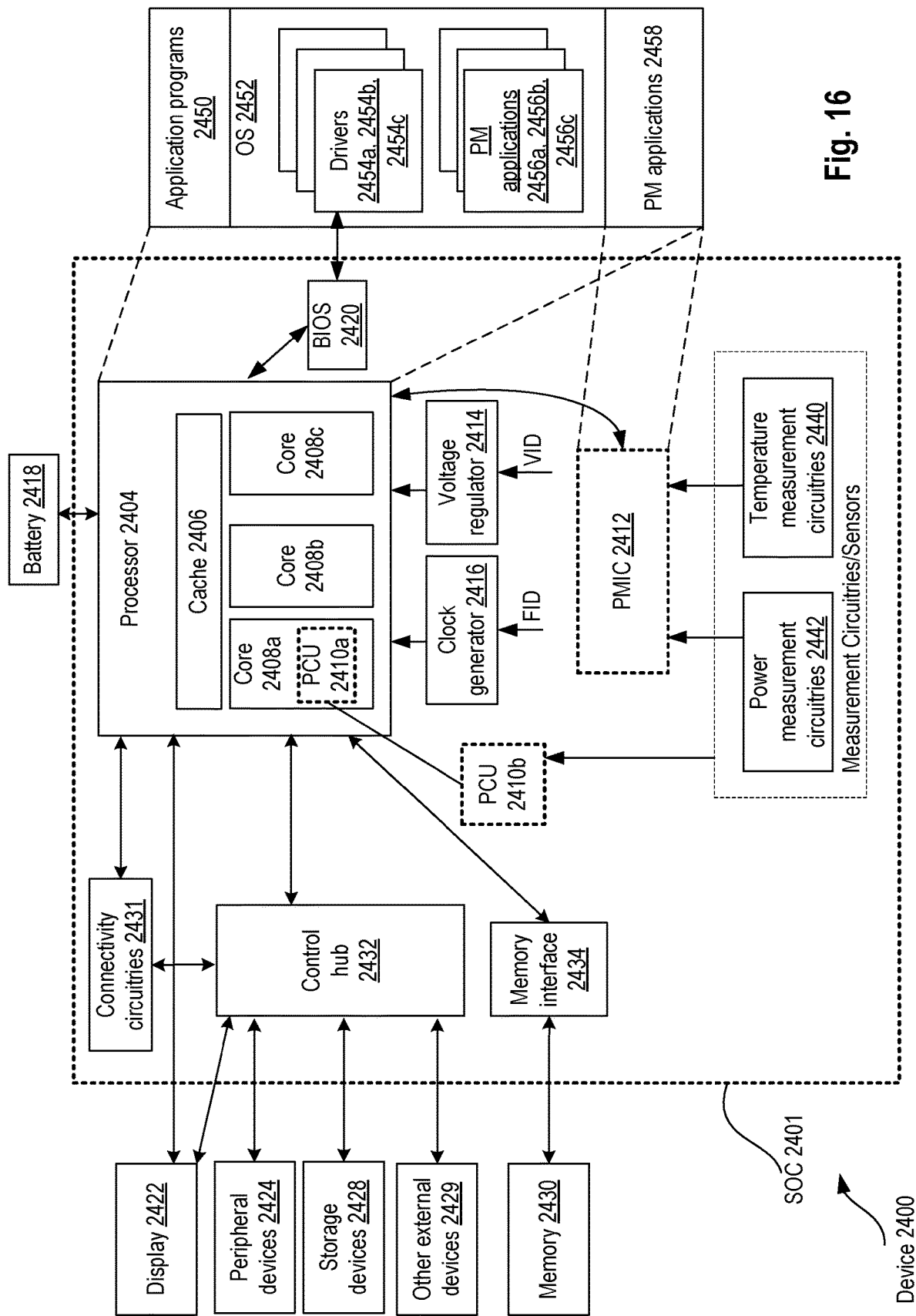
FIG. 16 illustrates a smart device or a computer system or a SoC (System-on-Chip) according to the apparatus, method, and system of various embodiments.

FIG. 16 illustrates a smart device or a computer system or a SoC (System-on-Chip) which includes the apparatus, methods, and systems of various embodiments. It is pointed out that those elements of FIG. 16 having the same reference numbers (or names) as the elements of any other figure may operate or function in any manner similar to that described, but are not limited to such.

In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises an SoC (System-on-Chip) 2401. An example boundary of the SOC 2401 is illustrated using dotted lines in FIG. 16, with some example components being illustrated to be included within SOC 2401—however, SOC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408a, 2408b, 2408c. Although merely three cores 2408a, 2408b, 2408c are illustrated in FIG. 16, processor 2404 may include any other appropriate number of processing cores, e.g., tens, or even hundreds of processing cores. Processor cores 2408a, 2408b, 2408c may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408a, a second section of cache 2406 dedicated to core 2408b, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS)

system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

In some embodiments, one or more of drivers 2454 implement a switchable graphics management scheme, which uses performance/watt information of both the integrated graphics (iGPU) or discrete graphics (dGPU) along with system real-time resources like SoC (system-on-chip) thermal, system power budgets to decide on the right GPU for rendering tasks. The scheme uses this threshold power point information along with system resources to determine the optimized GPU for tasks rendering for all applications and use cases. As such, the scheme of adapts to each system design based on capabilities of that specific system.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random-access memory (DRAM) device, a static random-access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores 2408a, 2408b, 2408c, voltage regulator 2414, memory 2430, a motherboard of SOC 2401, and/or any appropriate component of device 2400.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SOC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410a/b and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410a. In an example, some other sections of PCU 2410 may be implemented outside the processing cores 2408, and these sections of PCU 2410 are symbolically illustrated using a dotted box and labelled as PCU 2410b. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., C0 state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456*a*, 2456*b*, 2456*c*. The OS 2452 may also include various drivers 2454*a*, 2454*b*, 2454*c*, etc., some of which may be specific for power management purposes. In some embodiments, device 2400 may further comprise a Basic Input/output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

In some embodiments, battery 2418 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 2410*a/b* has a capability to enable extra compute and telemetries resources for the runtime support of the pCode. Here pCode refers to a firmware executed by PCU 2410*a/b* to manage performance of the 2401. For example, pCode may set frequencies and appropriate voltages for the processor. Part of the pCode are accessible via OS 2452. In various embodiments, mechanisms and methods are provided that dynamically change an Energy Performance Preference (EPP) value based on workloads, user behavior, and/or system conditions. There may be a well-defined interface between OS 2452 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 2452 by including machine-learning support as part of OS 2452 and either tuning the EPP value that the OS hints to the hardware (e.g., various components of SCO 2401) by machine-learning prediction, or by delivering the machine-learning prediction to the pCode in a manner similar to that done by a Dynamic Tuning Technology (DTT) driver. In this model, OS 2452 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 2452 and the other from software such as DTT, and may selectively choose to provide higher performance and/or responsiveness. As part of this method, the pCode may enable in the DTT an option to tune its reaction for the DTT for different types of activity.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A graphics processor comprising: an integrated graphics processing unit (iGPU); a discrete graphics processing unit (dGPU); and logic to adaptively apply performance per watt information of both the iGPU and the dGPU, and thermal power point (TPP) to determine which one of the iGPU or dGPU is to execute a rendering task.

Example 2: The graphics processor of example 1, wherein the logic is to receive telemetry information before it is to determine which one of the iGPU or dGPU is to execute the rendering task.

Example 3: The graphics processor of example 2, wherein the logic is to determine an average power consumption of the graphics processor via instantaneous power data and previous power data received by the telemetry information.

Example 4: The graphics processor of example 3, wherein the logic is to determine whether the average power consumption is greater than the TPP, and if the average power consumption is greater than the TPP the logic is to select the dGPU to execute the rendering task.

Example 5: The graphics processor of example 4, wherein if the average power consumption is less than the TPP the logic is to select the iGPU to execute the rendering task.

Example 6: The graphics process of example 3, if the average power consumption has a number of low and high transitions above a threshold number, then the logic is to determine which one of the iGPU or dGPU is to execute the rendering task in accordance with a duty cycle of the average power consumption.

Example 7: The graphics processor of example 4, wherein the logic is to request an operating system or driver to select the iGPU for rendering the task if the logic determines that a power source is not capable of supporting power consumption of the dGPU.

Example 8: The graphics processor of example 5, wherein the logic is to request an operating system or driver to select the dGPU for rendering the task if the logic determines that a processor core of the graphics processor is thermally constrained.

Example 9: The graphics processor of example 1, wherein prior to the logic to determine which one of the iGPU or dGPU is to execute the rendering task, an operating system or driver is to decide which one of the iGPU or dGPU is to execute the rendering task.

Example 10: The graphics processor of example 1, wherein the TPP is determined by stressing the graphics processor with various applications.

Example 11: The graphics processor of example 1, wherein the TPP is passed on to a BIOS or an embedded controller.

Example 12: A machine-readable media having instructions stored thereon that when executed cause a graphics processing unit (GPU) to perform a method comprising: stressing the GPU with various applications to determine a thermal power point (TPP); adaptively applying performance per watt information of both an integrated graphics processing unit (iGPU) and a discrete graphics processing unit (dGPU), and the TPP to determine which one of the iGPU or dGPU is to execute a rendering task; and selecting one of the iGPU or dGPU is to execute the rendering task according to the performance per watt information and the TPP.

Example 13: The machine-readable media of example 12 having instructions stored thereon that when executed cause the GPU to perform the method comprising: receiving telemetry information before determining which one of the iGPU or dGPU is to execute the rendering task.

Example 14: The machine-readable media of example 13 having instructions stored thereon that when executed cause the GPU to perform the method comprising: determining an average power consumption of the GPU via instantaneous power data and previous power data received by the telemetry information.

Example 15: The machine-readable media of example 14 having instructions stored thereon that when executed cause the GPU to perform the method comprising: determining whether the average power consumption is greater than the TPP, and if the average power consumption is greater than the TPP, selecting the dGPU to execute the rendering task.

Example 16: The machine-readable media of example 15 having instructions stored thereon that when executed cause the GPU to perform the method comprising: selecting the iGPU to execute the rendering task if the average power consumption is less than the TPP.

Example 17: The machine-readable media of example 14 having instructions stored thereon that when executed cause the GPU to perform the method comprising: if the average power consumption has a number of low and high transitions above a threshold number, determining which one of the iGPU or dGPU is to execute the rendering task in accordance with a duty cycle of the average power consumption.

Example 18: The machine-readable media of example 15 having instructions stored thereon that when executed cause the GPU to perform the method comprising: requesting an operating system or driver to select the iGPU for rendering the task if it is determined that a power source is not capable of supporting power consumption of the dGPU.

Example 19: The machine-readable media of example 16 having instructions stored thereon that when executed cause the GPU to perform the method comprising: requesting an operating system or driver to select the dGPU for rendering the task if it is determined that a processor core of the GPU is thermally constrained.

Example 20: A system comprising: a memory; a graphics processor unit (GPU) coupled to the memory; and a wireless interface to allow the GPU to communicate with another device, wherein the GPU is according to any one of examples 1 to 11.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A graphics processor, comprising:
   an integrated graphics processing unit (iGPU);
   a discrete graphics processing unit (dGPU); and
   logic to determine a power consumption of the iGPU when the iGPU starts processing data of an application, and when the power consumption crosses above a threshold, determine whether to request that an operating system or driver selects the dGPU in place of the iGPU to execute the application; wherein:
   the power consumption is an exponentially weighted moving average power consumption of the iGPU; and
   the threshold is set such that a performance of the iGPU is equal to a performance of the dGPU until the power consumption of the iGPU crosses above the threshold, and a performance of the iGPU falls below a performance of the dGPU when the power consumption of the iGPU crosses above the threshold.

2. The graphics processor of claim 1, wherein to determine the power consumption, the logic is to:
   receive telemetry information from a voltage regulator; and
   determine an average power consumption of the graphics processor via current power data and previous power data received by the telemetry information.

3. The graphics processor of claim 1, wherein the iGPU has a duty cycle based on a number of times the power consumption crosses the threshold, and the logic is to determine whether to request that the operating system or driver selects the dGPU in place of the iGPU based on the duty cycle.

4. The graphics processor of claim 1, wherein the logic is to continue to allow the iGPU to execute the application if the logic determines that a power source is not capable of supporting a power consumption of the dGPU when the power consumption of the iGPU crosses above the threshold.

5. The graphics processor of claim 1, wherein the logic is to continue to allow the iGPU to execute the application if the logic determines that a processor core of the graphics processor is thermally constrained when the power consumption of the iGPU crosses above the threshold.

6. The graphics processor of claim 1, wherein prior to the logic determining the power consumption of the iGPU, the operating system or driver is to select the iGPU over the dGPU to execute the application.

7. The graphics processor of claim 1, wherein the logic comprises a graphics power management algorithm performed by software, hardware, or a combination thereof.

8. The graphics processor of claim 1, wherein the logic is to continue to allow the iGPU to execute the application if the logic determines that a processor core of the graphics processor is being throttled when the power consumption of the iGPU crosses above the threshold.

9. The graphics processor of claim 1, wherein the threshold is set such that a performance of the iGPU is less than a performance of the dGPU when the power consumption of the iGPU exceeds the threshold.

10. A non-transitory machine-readable media having instructions stored thereon that when executed cause a graphics processing unit (GPU) to perform a method comprising:
    stressing an integrated graphics processing unit (iGPU) and a discrete graphics processing unit (dGPU) with various applications;
    determining a performance of the iGPU, a performance of the dGPU, and a power consumption of the iGPU during the stressing for each application of the various applications;
    determining one or more applications of the various applications in which the performance of the iGPU decreases relative to the performance of the iGPU in other applications of the various applications while a performance of the dGPU does not decrease relative to the performance of the dGPU in the other applications of the various applications;
    determining a threshold power point (TPP) based on the power consumption of the iGPU when the performance of the iGPU decreases while the performance of the dGPU does not decrease; and
    passing the TPP to a graphics power management algorithm.

11. The non-transitory machine-readable media of claim 10, wherein the method performed further comprises determining the power consumption of the iGPU as an average power consumption based on current power data and previous power data.

12. The non-transitory machine-readable media of claim 10, wherein the method performed further comprises determining the power consumption of the iGPU as an exponentially weighted moving average power consumption.

13. The non-transitory machine-readable media of claim 10, wherein the graphics power management algorithm is configured to select the iGPU to execute a rendering task if the power consumption of the iGPU is less than the TPP.

14. The non-transitory machine-readable media of claim 10, wherein the TPP is based on a duty cycle of the iGPU, and the duty cycle is based on a number of times the power consumption of the iGPU crosses the TPP.

15. The non-transitory machine-readable media of claim 10, wherein the graphics power management algorithm is configured to select the iGPU or dGPU to execute a rendering task based on the TPP and a comparison of the power consumption of the iGPU to the TPP.

16. The non-transitory machine-readable media of claim 10, wherein the TPP is passed to the graphics power management algorithm via a Basic Input/output System (BIOS) or an embedded controller.

17. A system, comprising:
a memory;
a general purpose processor coupled to the memory; and
a graphics processor coupled to the general purpose processor, wherein the graphics processor comprises:
an integrated graphics processing unit (iGPU);
a discrete graphics processing unit (dGPU); and
logic to determine which one of the iGPU or dGPU is to execute a rendering task based on a comparison of a power consumption of the iGPU to a threshold, wherein the threshold is set such that a performance of the iGPU is equal to a performance of the dGPU until the power consumption of the iGPU crosses above the threshold, and the performance of the iGPU falls below a performance of the dGPU when the power consumption of the iGPU crosses above the threshold, and the logic is to determine an exponentially weighted moving average of the power consumption of the iGPU.

18. The system of claim 17, wherein the logic is to receive telemetry information regarding the power consumption of the iGPU before the logic is to determine which one of the iGPU or dGPU is to execute the rendering task.

19. The system of claim 18, wherein the logic is to determine the exponentially weighted moving average of the power consumption of the iGPU via current power data and previous power data received by the telemetry information.

20. The system of claim 19, wherein the logic is to determine whether the average power consumption is greater than the threshold, and if the average power consumption is greater than the threshold, the logic is to select the dGPU to execute the rendering task, and if the average power consumption is less than the threshold, the logic is to select the iGPU to execute the rendering task.

21. The system of claim 17, wherein the threshold is set such that the performance of the iGPU falls below the performance of the dGPU when the power consumption of the iGPU crosses above the threshold and the performance of the dGPU does not decrease.

* * * * *